(12) United States Patent
Tiedemann et al.

(10) Patent No.: US 9,908,735 B2
(45) Date of Patent: Mar. 6, 2018

(54) ROLLBACK PREVENTER FOR INJECTION MOLDED TAPE DISPENSERS

(71) Applicants: Larry E. Tiedemann, Winona, MN (US); Robert J. Harter, La Crosse, WI (US)

(72) Inventors: Larry E. Tiedemann, Winona, MN (US); Robert J. Harter, La Crosse, WI (US)

( * ) Notice: Subject to any disclaimer, the term of this patent is extended or adjusted under 35 U.S.C. 154(b) by 0 days.

(21) Appl. No.: 15/053,922

(22) Filed: Feb. 25, 2016

(65) Prior Publication Data

US 2016/0355366 A1 Dec. 8, 2016

Related U.S. Application Data

(63) Continuation-in-part of application No. 14/731,614, filed on Jun. 5, 2015, now Pat. No. 9,809,411.

(51) Int. Cl.
| | |
|---|---|
| *B32B 27/00* | (2006.01) |
| *B44C 7/00* | (2006.01) |
| *B65H 35/00* | (2006.01) |
| *B29C 45/16* | (2006.01) |
| *B29C 33/00* | (2006.01) |

(52) U.S. Cl.
CPC ....... *B65H 35/0026* (2013.01); *B65H 35/002* (2013.01); *B29C 33/005* (2013.01); *B29C 45/1676* (2013.01); *Y10T 156/1795* (2015.01)

(58) Field of Classification Search
CPC ............ B65H 35/0026; B65H 35/0033; B65H 37/005

USPC .......... 225/39, 46, 65, 66, 47; 156/527, 523, 156/577
See application file for complete search history.

(56) References Cited

U.S. PATENT DOCUMENTS

| | | | |
|---|---|---|---|
| 2,676,765 | A | 4/1954 | Kaplan |
| 2,731,084 | A | 1/1956 | Burns |
| 3,155,301 | A | 11/1964 | Kusek |
| 3,725,182 | A | 4/1973 | Regan |
| 3,895,059 | A | 7/1975 | Link |
| 4,623,421 | A | 11/1986 | Cardin |
| 4,729,518 | A | 3/1988 | Mathna et al. |
| 4,961,525 | A | 10/1990 | Corbo et al. |

(Continued)

FOREIGN PATENT DOCUMENTS

GB 2361910 A * 11/2001 ......... B65H 35/0026

*Primary Examiner* — Alex Efta
(74) *Attorney, Agent, or Firm* — www.bobharter.com; Robert J. Harter

(57) ABSTRACT

A tape dispenser includes a plastic injection molded frame with a resiliently flexible finger that helps prevent the free end of a roll of tape from accidentally retracting, falling back, and frustratingly sticking to the coiled portion of the tape. To avoid this problem, a distal end of the finger presses against the inner diameter of a cardboard or plastic spool about which the tape is wrapped. Friction between the finger's distal end and the spool's inner diameter inhibits reverse rotation of the spool. To avoid breaking the finger while forcefully loading the roll of tape into the dispenser during assembly, a lateral backstop surface on the dispenser prevents the spool from bending the finger too far in a laterally outward direction. To avoid breaking the finger during subsequent rough use, another backstop surface prevents the spool from bending the finger too far in a radially downward direction.

6 Claims, 15 Drawing Sheets

(56) References Cited

U.S. PATENT DOCUMENTS

| | | |
|---|---|---|
| 4,998,655 A | 3/1991 | Huang |
| 5,071,051 A | 12/1991 | Corbo et al. |
| 5,380,395 A | 1/1995 | Uchida |
| 5,802,695 A | 9/1998 | Willoughby |
| 5,820,005 A * | 10/1998 | Perkitny ............ B65H 35/0026 225/65 |
| 5,861,080 A | 1/1999 | Yang et al. |
| 5,878,932 A | 3/1999 | Huang |
| 5,921,450 A | 7/1999 | Robinson |
| D442,227 S | 5/2001 | Carlson et al. |
| D448,413 S | 9/2001 | Carlson et al. |
| 6,669,070 B2 * | 12/2003 | Huang ............... B65H 35/0026 225/56 |
| 6,672,532 B1 | 1/2004 | Huang |
| D507,020 S | 7/2005 | Mueller et al. |
| 6,923,358 B2 | 8/2005 | Chandaria |
| 7,021,356 B2 | 4/2006 | Kelders et al. |
| 7,077,185 B2 | 7/2006 | Steinberger |
| D529,093 S | 9/2006 | Gullicks et al. |
| D533,594 S | 12/2006 | Gullicks et al. |
| D533,905 S | 12/2006 | Gullicks et al. |
| D534,589 S | 1/2007 | Gullicks et al. |
| 7,195,048 B2 | 3/2007 | Wojtkun et al. |
| 7,353,854 B2 | 4/2008 | Yu Chen |
| D568,400 S | 5/2008 | Packard et al. |
| 7,370,782 B2 | 5/2008 | Thompson et al. |
| D588,646 S | 3/2009 | Vulpitta |
| D591,354 S | 4/2009 | Vulpitta |
| 7,712,508 B2 | 5/2010 | Huang |
| 8,042,592 B2 | 10/2011 | Crawford et al. |
| 8,191,597 B2 | 6/2012 | Vulpitta |
| D664,201 S | 7/2012 | Packard et al. |
| D665,027 S | 8/2012 | Packard et al. |
| D681,734 S | 5/2013 | Hagglund et al. |
| D687,102 S | 7/2013 | Chandaria |
| 8,479,794 B2 | 7/2013 | Vulpitta |
| 8,746,316 B2 | 6/2014 | Kropp et al. |
| 8,813,806 B2 | 8/2014 | Vulpitta |
| 8,925,611 B2 | 1/2015 | Hagglund et al. |
| 8,955,572 B2 | 2/2015 | Huang |
| 2002/0079345 A1 | 6/2002 | Shah |
| 2010/0084450 A1 | 4/2010 | Vulpitta |
| 2015/0266692 A1 | 9/2015 | Tiedemann et al. |

* cited by examiner

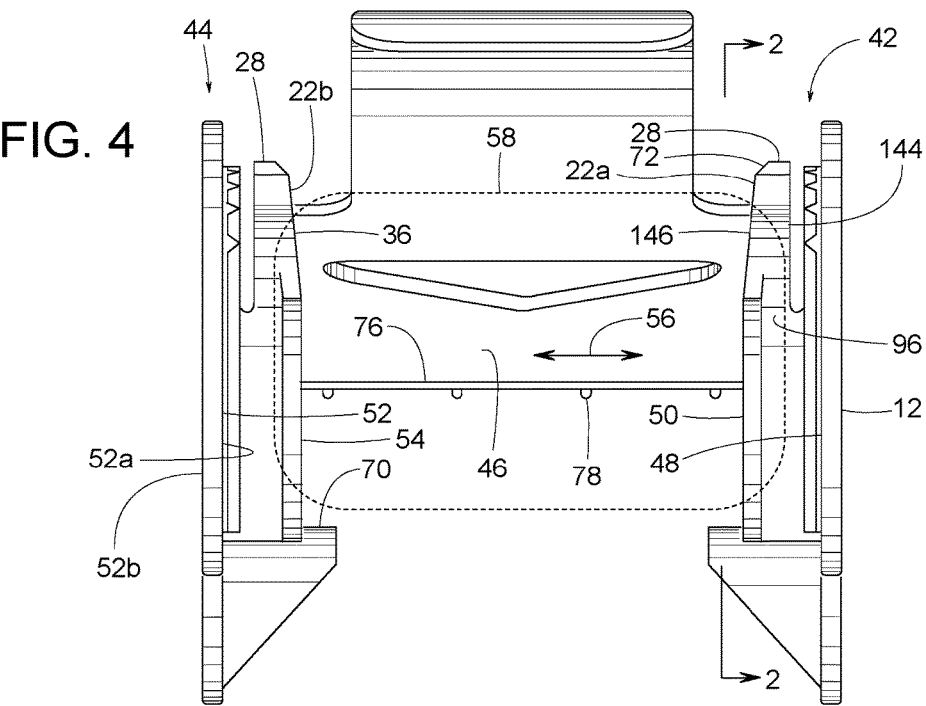
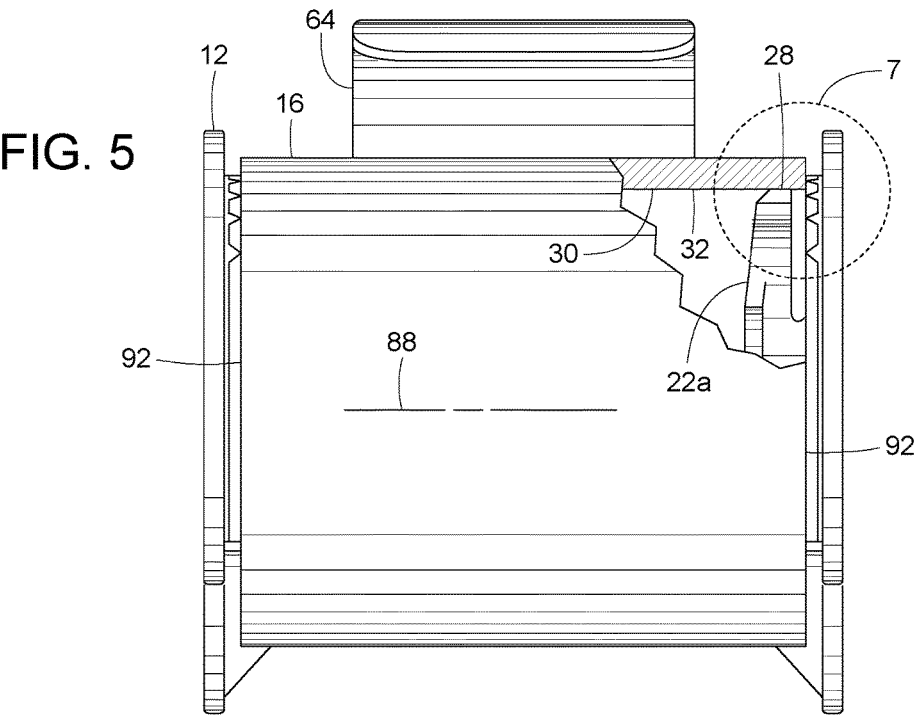

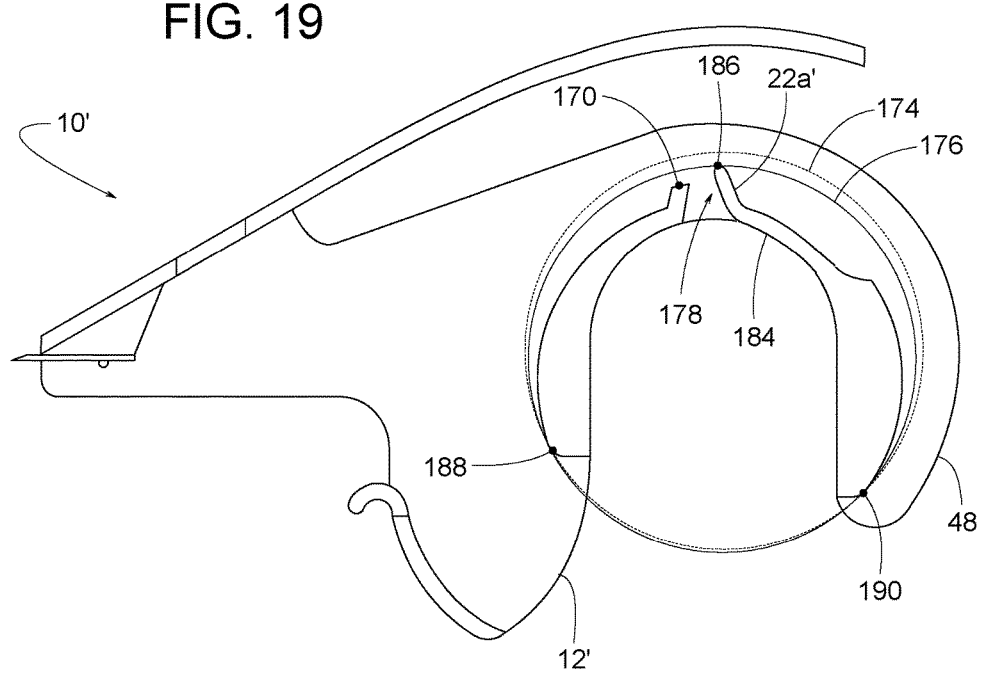
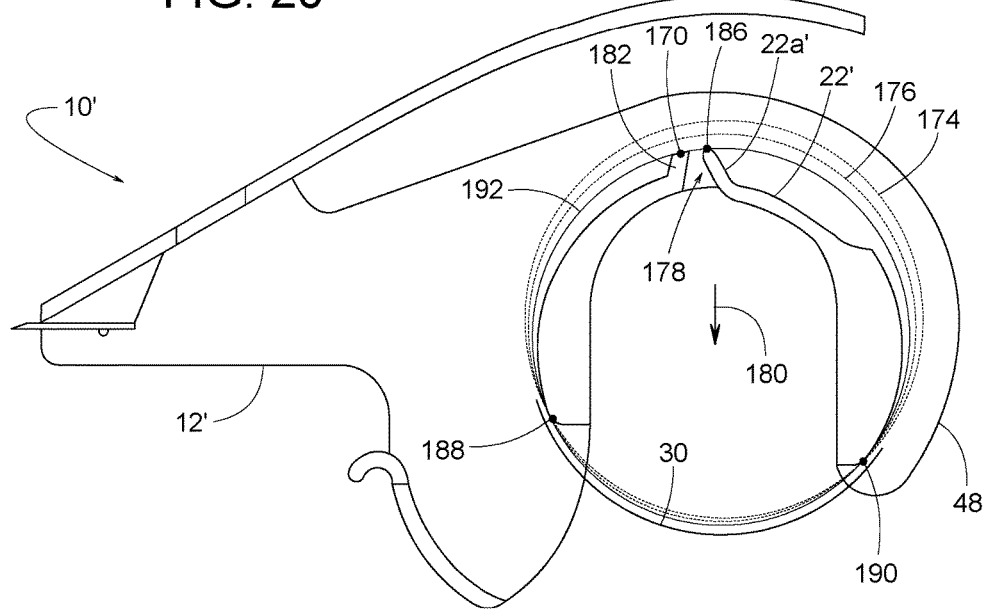

ROLLBACK PREVENTER FOR INJECTION MOLDED TAPE DISPENSERS

CROSS REFERENCE TO RELATED APPLICATIONS

This application is a continuation-in-part of non-provisional patent application Ser. No. 14/731,614 filed on Jun. 5, 2015; which is specifically incorporated by reference herein.

FIELD OF THE DISCLOSURE

The present disclosure relates to adhesive tape dispensers for handling a roll of tape and more specifically to plastic injection molded dispensers with integral means for preventing the end of the tape from accidentally falling back onto the roll.

BACKGROUND

Some pressure-sensitive adhesive tapes come preloaded in a plastic tape dispenser. One example of such tape is sometimes referred to as packaging tape, packing tape, shipping tape, box-sealing tape or parcel tape. Packaging tape is often made of about a two-inch wide strip of polypropylene or polyester film with a pressure-sensitive adhesive coating on one side of the film. The tape is usually wound upon a cardboard or plastic spool with the adhesive side of the film facing inward toward the spool. Consumers and businesses often use packaging tape for sealing cardboard boxes. Depending on the cost, durability and design of the dispenser, some plastic tape dispensers are reusable while others are more disposable.

SUMMARY

The tape dispenser system disclosed herein helps prevent the free end of a roll of tape from accidentally falling back onto the coiled portion of the tape. This is accomplished with at least one anti-reverse rotation pawl that is a seamless integral extension of a monolithic tape dispenser frame. The pawl being an integral extension of the frame itself avoids or minimizes the use of moving parts, and thus avoids or reduces assembly costs and frictional wear. In some examples, the frame is plastic injection molded with a parting line that is strategically positioned to enable the frame to have two spool-supporting sidewalls that provide the roll of tape with greater support.

In one aspect, a tape dispenser system is provided that includes a first sidewall; a second sidewall spaced apart from the second sidewall to define a spool-receiving chamber between the first sidewall and the second sidewall; a bridge providing an integral seamless connection between the first sidewall and the second sidewall; a first flange extending from the first sidewall toward the second sidewall, the first flange defining an air gap between a first segment of the first flange and a second segment of the first flange; a second flange extending from the second sidewall toward the first sidewall; a spool having selectively an installed position and a removed position, the spool being radially supported by the first flange and the second flange within the spool-receiving chamber when the spool is in the installed position, the spool being outside of the spool-receiving chamber when the spool is in the removed position, the spool being tubular and having an axial length and an inner surface; an adhesive tape wrapped around the spool; and a first pawl extending from at least one of the first sidewall and the first flange, the first pawl having a first tip that is spaced apart from both the first sidewall and the second sidewall, the first tip engaging a point of contact on the inner surface of the spool when the spool is in the installed position, the first tip being between the air gap and the point of contact on the inner surface of the spool when the spool is in the installed position.

In another aspect, a tape dispenser system is provided that includes a first sidewall; a second sidewall spaced apart from the second sidewall to define a spool-receiving chamber between the first sidewall and the second sidewall; a bridge extending from the first sidewall to the second sidewall, the bridge having a tape-discharge edge; a first flange extending from the first sidewall toward the second sidewall; a second flange extending from the second sidewall toward the first sidewall; a spool having selectively an installed position and a removed position, the spool being radially supported by the first flange and the second flange within the spool-receiving chamber when the spool is in the installed position, the spool being outside of the spool-receiving chamber when the spool is in the removed position, the spool having an axial length and an inner diameter; an adhesive tape wrapped around the spool; a first pawl extending from at least one of the first sidewall and the first flange, the first pawl having a first tip that is spaced apart from both the first sidewall and the second sidewall, the first tip engaging the inner diameter of the spool when the spool is in the installed position; a first side member being comprised of the first sidewall, the first flange and the first pawl; a second side member being comprised of the second sidewall and the second flange; and a monolithic frame being comprised of the first side member, the second side member and the bridge; the monolithic frame being configured selectively to a relaxed position, a splayed position, and a loaded position; the first pawl being at a first distance from the second sidewall when the monolithic frame is in the relaxed position; the first pawl being at a second distance from the second sidewall when the monolithic frame is in the splayed position; the first pawl being at a third distance from the second sidewall when the monolithic frame is in the loaded position; the second distance being greater than the first distance; the second distance being greater than the third distance; the second distance providing sufficient clearance for the spool to be moved between the installed position and the removed position; the monolithic frame being in the relaxed position when the spool is in the removed position; and the monolithic frame being in the loaded position when the spool is in the installed position.

In another aspect, a tape dispenser method involves the use of a first mold block, a second mold block, and a plastic material, wherein the tape dispenser method includes the first mold block defining a first cavity system; the second mold block defining a second cavity system; forcing the first mold block and the second mold block together such that the first mold block and the second mold block engage each other at a mold interface; upon forcing the first mold block and the second mold block together, the first cavity system and the second cavity system creating a total cavity; injecting the plastic material into the total cavity; solidifying the plastic material in the total cavity, thereby creating a tape dispenser frame comprising a first sidewall, a first flange on the first sidewall, a second sidewall, a second flange on the second sidewall, a bridge extending between the first sidewall and the second sidewall, and a first pawl extending from at least one of the first sidewall and the first flange; the first sidewall at least momentarily extending into both the first cavity system and the second cavity system; the second sidewall at least momentarily extending into both the first cavity system and the second cavity system; removing the tape dispenser frame from the total cavity; resiliently splaying the first sidewall and the second sidewall to widen a spool-receiving chamber between the first sidewall and the second sidewall; inserting the spool into the spool-receiving chamber; at least one of the first sidewall and the second sidewall flexing toward the spool; the first flange and the second flange supporting the spool; and the first pawl engaging an inner diameter of the spool such that the spool can rotate more freely in one direction than in an opposite direction.

The above summary is not intended to describe each disclosed embodiment of every implementation of the present invention. The brief description of the drawings and the detailed description which follows more particularly exemplify illustrative embodiments.

BRIEF DESCRIPTION OF THE DRAWINGS

FIG. 4 is a back view of FIG. 1.

FIG. 5 is a back view similar to FIG. 4 but showing an installed spool with no tape and with part of the spool cut away.

FIG. 19 is a diagram similar to FIG. 18 but showing geometric features associated with the spool being in the installed position.

FIG. 20 is a diagram similar to FIGS. 18 and 19 but showing geometric features associated with the spool being in the radially displaced position.

DETAILED DESCRIPTION

In the following description, reference is made to the accompanying set of drawings that form a part of the description hereof and in which are shown by way of illustration several specific embodiments. It is to be understood that other embodiments are contemplated and may be made without departing from the scope or spirit of the present invention. The following detailed description, therefore, is not to be taken in a limiting sense.

Figure 3:
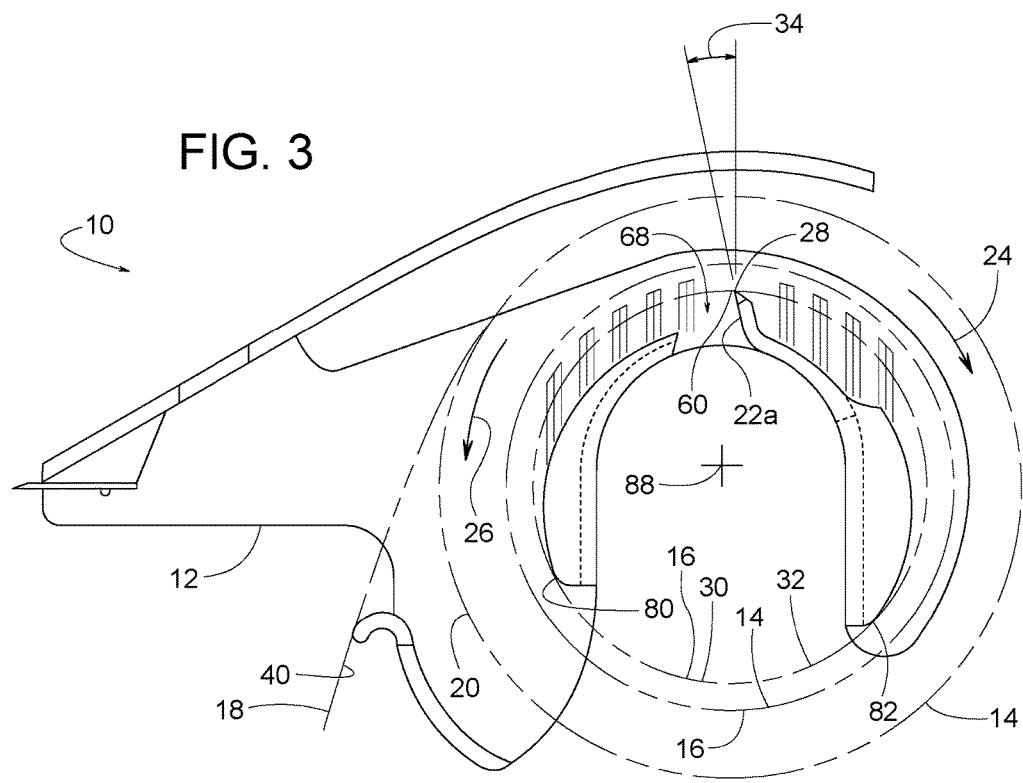
FIG. 3 is a cross-sectional view similar to FIG. 3 but showing an installed roll of tape in phantom lines.

FIGS. 1-10 show various views and configurations of an example tape dispenser system 10 comprising a plastic injected molded frame 12 for supporting a coil of adhesive tape 14 wrapped around a spool 16. To prevent a free end 18 of tape 14 from accidentally retracting and adhering back onto a coiled portion 20 of tape 14, frame 12 includes at least one integral pawl 22 (e.g., a first pawl 22a and second pawl 22b) for inhibiting reverse rotation of spool 16. Arrow 24 of FIG. 3 represents the direction of inhibited reverse rotation, and arrow 26 represents the permitted forward direction of rotation during normal use. To inhibit reverse rotation, a tip 28 of pawl 22 engages an inner diameter 30 or inner surface 32 of spool 16 at a favorable rake angle 34 (e.g., between about five and twenty degrees), and a spring arm 36 of pawl 22 presses tip 28 radially outward against spool 16 at a desirable pressure.

In some examples, spool 16 is a cardboard tube having an axial length 38 and inner surface 32. Tape 14 is made of a polypropylene or polyester film with a pressure-sensitive adhesive coating 40 on an underside of the film. Such tape is sometimes known as packaging tape, packing tape, box-sealing tape or parcel tape.

In the illustrated example, tape dispenser system 10 comprises a first side member 42, a second side member 44 and a bridge 46 that provides an integral seamless connection between side members 42 and 44. In some examples, first side member 42 comprises a first sidewall 48, a first flange 50 extending inwardly from first sidewall 48, and first pawl 22a extending from first flange 50 and/or from first sidewall 48. Likewise, second side member 44 comprises a second sidewall 52, a second flange 54 extending inwardly from second sidewall 52, and second pawl 22b extending from second flange 54 and/or from second sidewall 52. Sidewalls 48 and 52 are spaced apart in an axial direction 56 to create a spool-receiving chamber 58 (FIG. 9) between sidewalls 48 and 52.

In some examples, to make frame 12 completely functional yet so inexpensive that some might consider it to be disposable, bridge 46 and side members 42 and 44 are plastic injection molded as a seamless unitary piece, whereby frame 12 is monolithic. Frame 12 being a seamless, monolithic piece makes it maintenance-free and quick and easy to manufacture. Although frame 18 can be made of various materials, some example frame materials are chosen so as to address the tape dispenser's various and sometimes conflicting design requirements. For some examples of tape dispenser system 10, the design requirements include, frame 12 having sufficient structural strength and stiffness to support a spool a tape, frame 12 being sufficiently flexible for loading or replacing a spool of tape between two side members 42 and 44, pawl 22 being stiff enough to exert enough gripping pressure against spool 16, pawl 22 being sufficiently flexible to accommodate radial movement and dimensional variance of spool 16, and pawl 22 providing an appropriate coefficient of friction at a point of contact 60 where tip 28 of pawl 22 engages inner surface 32 or inner diameter 30 of spool 16. To accomplish all this, some examples of frame 12 are plastic injection molded of ABS (acrylonitrile butadiene styrene).

Figure 6:
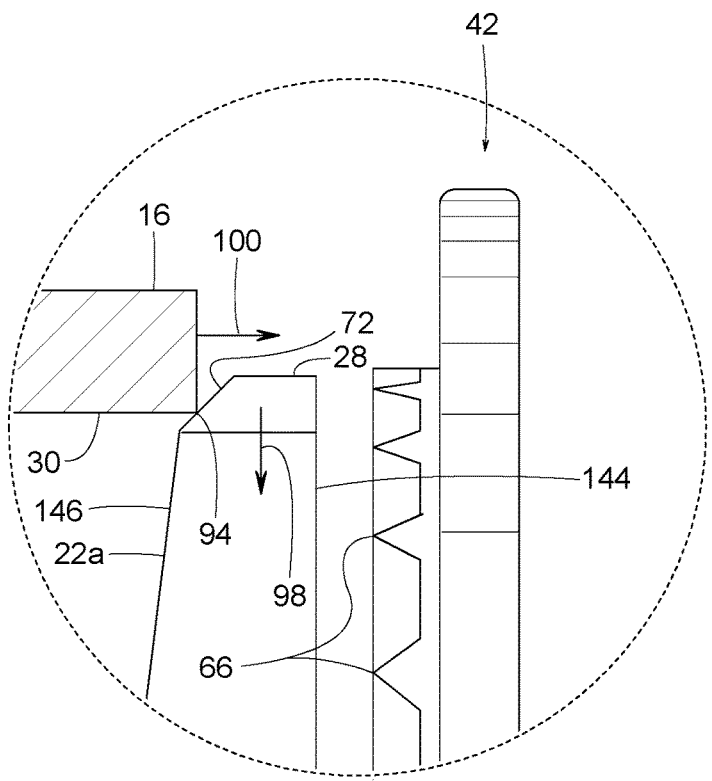
FIG. 6 is an enlarged view similar to FIG. 7 but showing the spool in the process of being installed.
Figure 7:
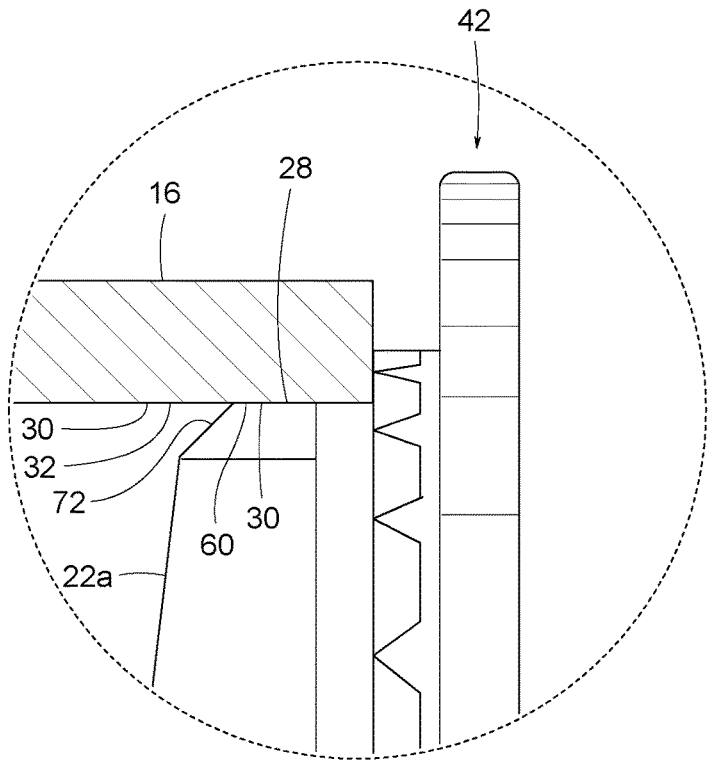
FIG. 7 is an enlarged view of encircled section-7 of FIG. 5.

Additional features of some examples of tape dispenser system 10 include a semi-flexible tongue 64, a series of ribs 66, an air gap 68 between two flange segments 50a and 50b of flange 50, a pair of tape-supporting ledges 70, a lead-in surface 72 at the pawl's tip 28, a tape-discharge edge 74 on bridge 46, a serrated blade 76 for cutting tape 14 near tape-discharge edge 74, one or more blade-holding features 78, multiple contact points 80 and 82 for supporting spool 16 in a radial direction, and a mold parting line 84 extending generally in a longitudinal direction 86 between a rotational axis 88 of spool 16 and an edge line 90 defined by tape-discharge edge 74. Tongue 64 can be used as a frictional brake pad for momentarily holding the roll of tape. Ribs 66 provide the equivalent of a flat contact surface against the axial ends 92 of spool 16 even if sidewalls 48 and 52 do not lie parallel to each other. Air gap 68 provides mold clearance for facilitating plastic injection molding of pawl 22 without interfering with flange 50 or 54. After blade 76 cuts off tape 14, ledges 70 prevent the tape's free end 18 from falling back onto the roll of tape, which works well if the roll of tape is kept from rotating backwards. Lead-in surface 72 at the pawl's tip 28, as shown in FIGS. 6 and 7, engages an inner axial edge 94 of spool 16 to help guide spool 16 into its installed position. Lead-in surface 72 is neither parallel nor perpendicular to rotational axis 88. Although lead-in surface 72 is tapered and straight in the illustrated example, other examples of lead-in surface 72 are tapered and curved. Blade-holding features 78, in some examples, are integral pins or protrusions of frame 12. Features 78 protrude into or otherwise engage holes or other mating features in blade 76 to help align and restrain blade 76 relative to tape-discharge edge 74. Contact points 80 and 82 along with the pawl's tip 28 establish the location of the spool's rotational axis 88. In addition or as an alternative to pawl 22, some examples of contact points 80 and/or 82 are in the form of a pawl-like element that provides or enhances the anti-reverse rotation function of tape dispenser system 10. Parting line 84 extending generally in longitudinal direction 86 makes it possible to injection mold a monolithic frame with side members 42 and 44 that provide ample support at both ends of spool 16. With this design, side members 42 and 44 provide spool support in both axial direction 56 and in a radial direction (perpendicular to axial direction 56), thus avoiding the use of alternative weaker structures such as a cantilever design.

Pawl 22, spool 16 and frame 12 have multiple selective configurations or positions. Pawl 22 is movable between a disengaged position (FIGS. 1, 2 and 4) and an engaged position (FIGS. 3 and 7). In the disengaged position, the pawl's tip 28 is spaced apart from spool 16. In the engaged position, the pawl's tip 28 engages spool 16 at the point of contact 60 on an inner diameter 30 or inner surface 32 of spool 16. Pawl 22 has a base 96 that connects to sidewall 48 and/or to flange 50. Pawl 22 extending from base 96 to tip 28 creates spring arm 36 that presses the pawl's tip 28 radially outward against the spool's inner surface 32. Tip 28 is spaced apart from both sidewalls 48 and 52 to facilitate a plastic injection process of making frame 12 and to provide pawl 22 with the freedom to flex without interference from neither sidewall 48 nor 52. With reference to a radial direction (i.e., perpendicular to axis 88 and axial direction 56), tip 28 is between point of contact 60 and air gap 68 to further facilitate a plastic injection molding process.

Spool 16 is movable between a removed position (FIG. 9) and an installed position (FIGS. 3, 5, 7 and 10). In the removed position, spool 16 is spaced apart from frame 12 and is outside of spool-receiving chamber 58. In the installed position, spool 16 is situated within spool-receiving chamber 58, engaged with pawl 22 and supported by side members 48 and 52. Arrow 98 of FIG. 6 represents pawl 22 automatically moving from its disengaged position toward its engaged position in response to the spool's inner axial edge 94 sliding along lead-in surface 72 as spool 16 moves from its removed position toward its installed position, as indicated by arrow 100.

Figure 8:
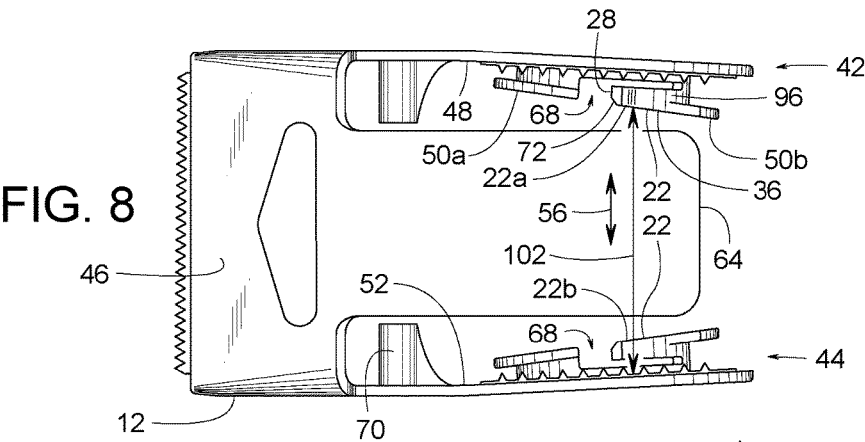
FIG. 8 is a top view of FIG. 8 with the frame in a relaxed position.
Figure 9:
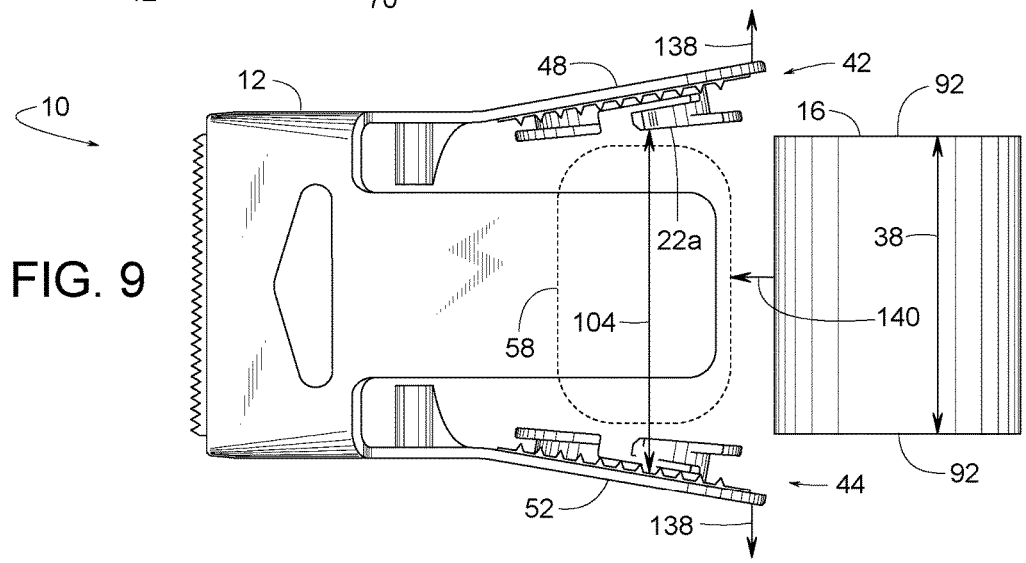
FIG. 9 is a top view similar to FIG. 8 but showing the frame in a splayed position about to receive the spool.
Figure 10:
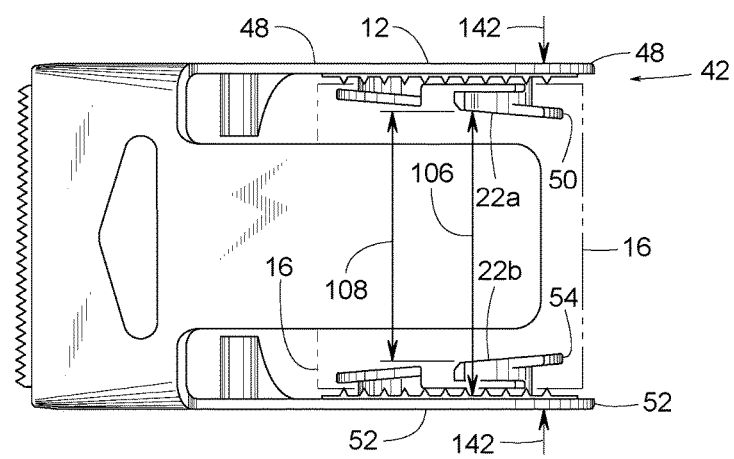
FIG. 10 is a top view similar to FIGS. 8 and 9 but showing the frame in a loaded position.

To install or remove spool 16, frame 12 is movable selectively to a relaxed position (FIGS. 1, 2, 4, and 8), a splayed position (FIG. 9), and a loaded position (FIGS. 3, 5, 7 and 10). In the relaxed position, pawl 22a is a first distance 102 from sidewall 52, as shown in FIG. 8. To install spool 16, as shown in FIG. 9, sidewalls 48 and 52 are resiliently spread apart to place pawl 22a at a second distance 104 from sidewall 52, wherein second distance 104 provides sufficient clearance for spool 16 to enter spool-receiving chamber 58. Once spool 16 is installed within spool-receiving chamber 58, sidewalls 48 and 52 are released to allow sidewalls 48 and 52 to move inward to where pawl 22a is at a third distance 106 from sidewall 52, as shown in FIG. 10. In some examples, third distance 106 is slightly greater than first distance 102 so that during normal operation sidewalls 48 and 52 apply light axial pressure against spool 16. In some examples, first distance 102 is substantially equal to third distance 106, which eases the installation and removal of spool 16. In the illustrated example, second distance 104 is greater than both first distance 102 and third distance 106, which helps ensure that spool 16 remains within spool-receiving chamber 58' during normal operation. In examples that include two pawls 22a and 22b on separate sidewalls 48 and 52, second pawl 22b is spaced apart from first pawl 22a by a pawl separation distance 108 that is greater when spool 16 is in the installed position than when spool 16 is in the removed position, thereby ensuring that both pawls 22a and 22b engage spool 16 while spool 16 is held snugly between sidewalls 48 and 52.

Figure 1:
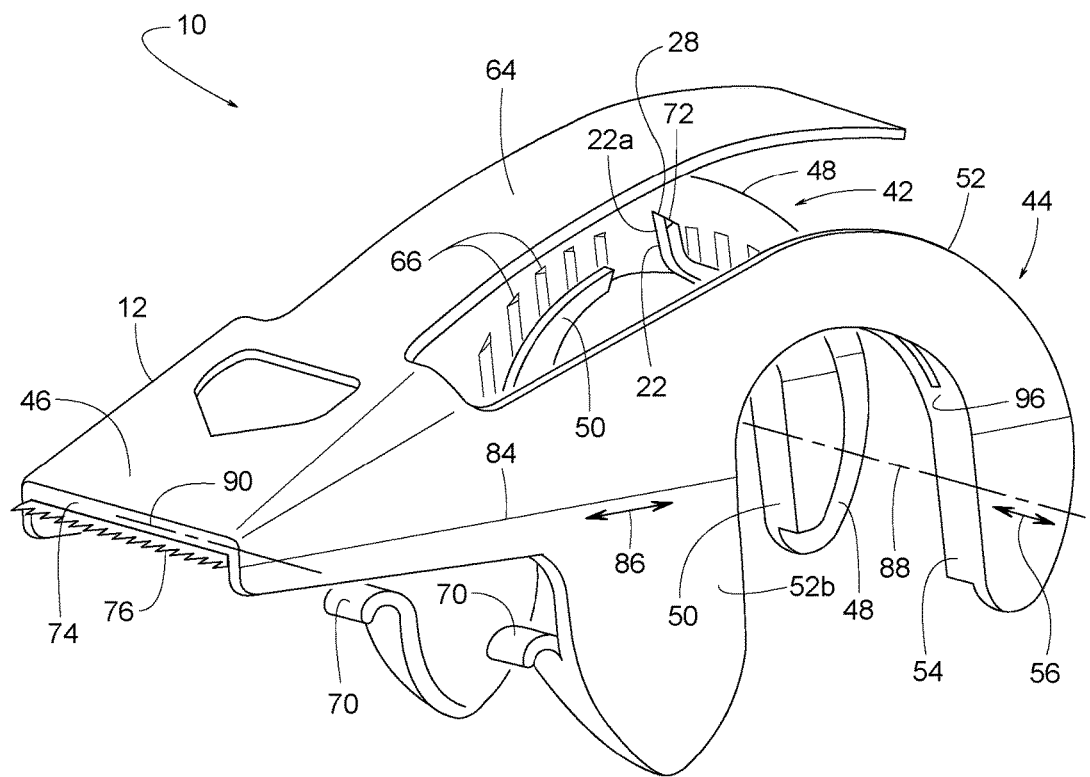
FIG. 1 is a front-left-top perspective view an example tape dispenser system constructed in accordance with the teachings disclosed herein.
Figure 2:
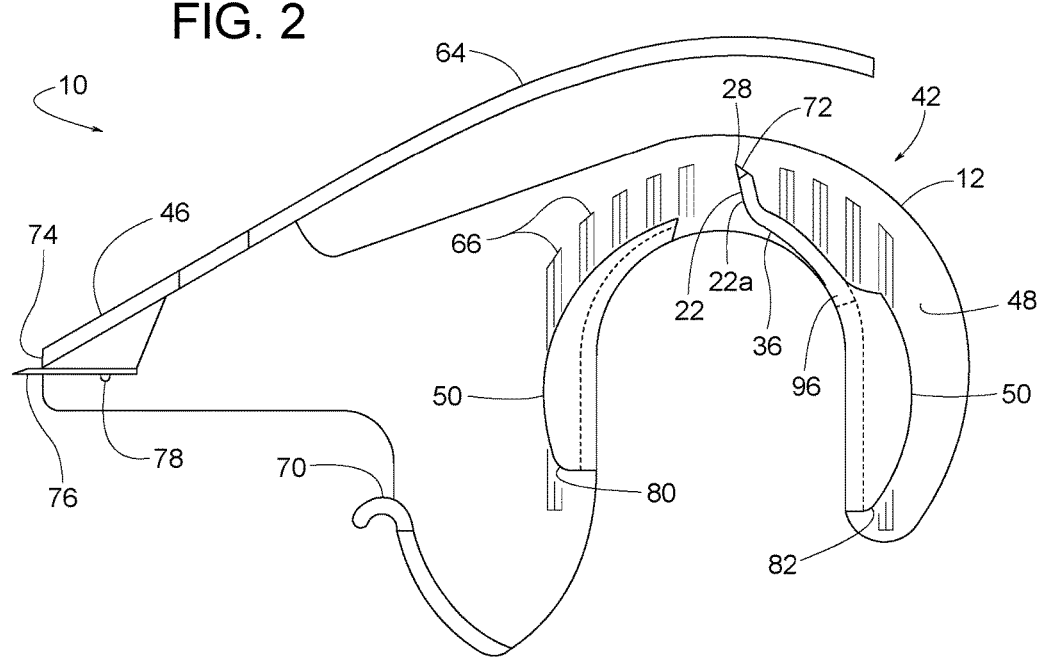
FIG. 2 is a cross-sectional view taken along line 2-2 of FIG. 4.
Figure 11:
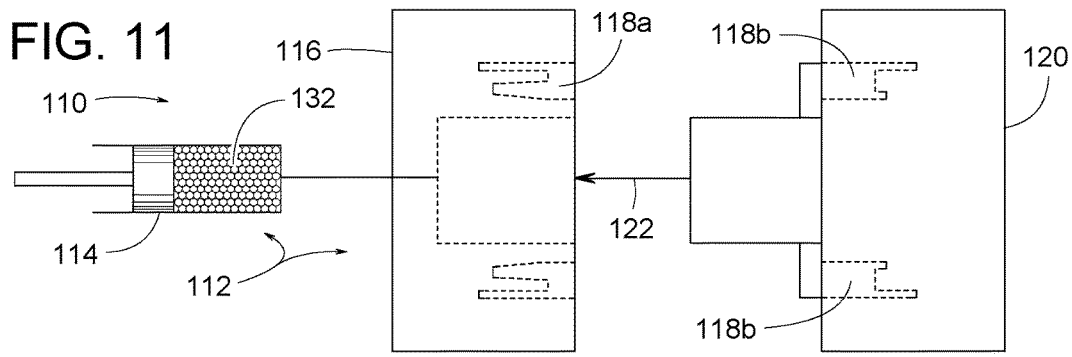
FIG. 11 is a schematic diagram showing an example tape dispenser method in accordance with the teachings disclosed herein.
Figure 12:
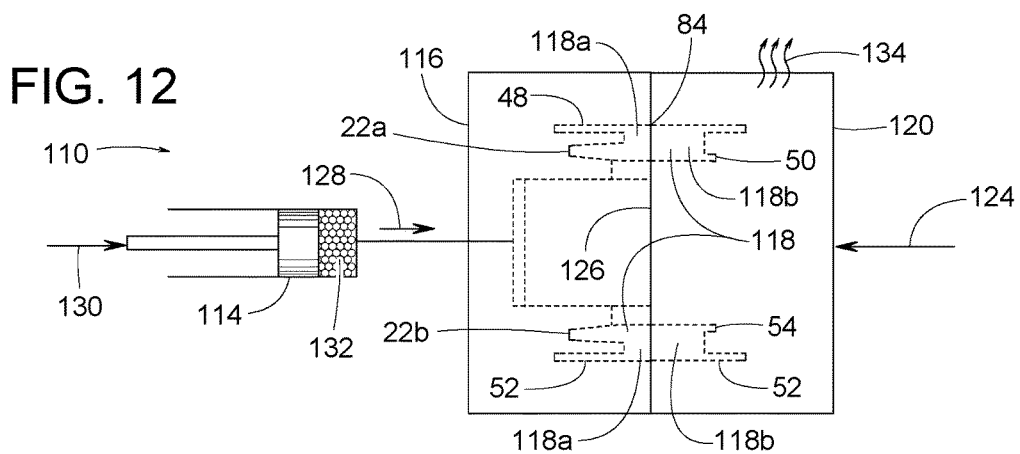
FIG. 12 is a schematic diagram showing another phase of the method shown in FIG. 11.
Figure 13:
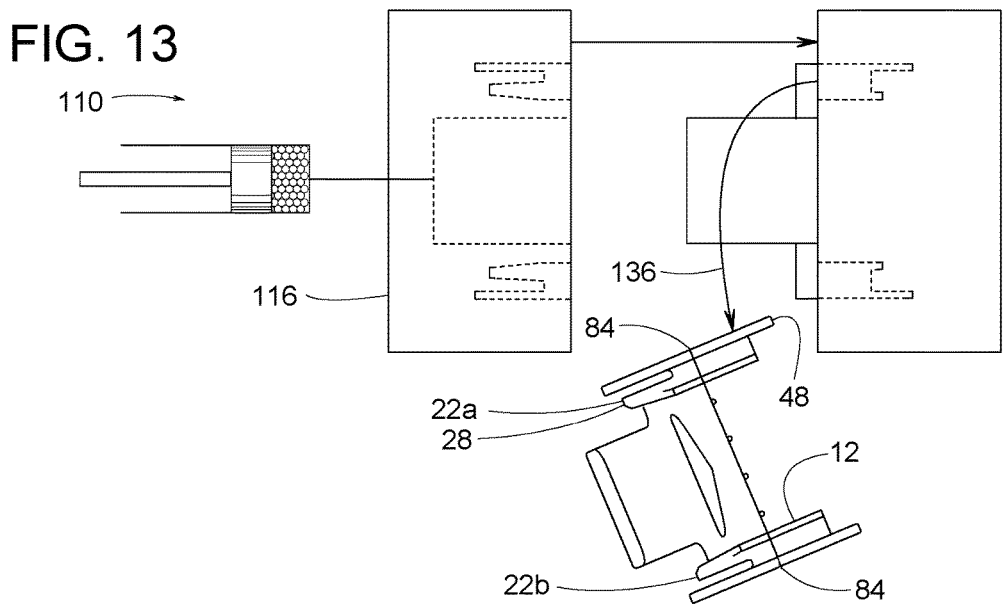
FIG. 13 is a schematic diagram showing yet another phase of the method shown in FIG. 11.

FIGS. 11-13 schematically illustrate an example tape dispenser method 110 for making frame 12 by way of a plastic injection molding machine 112. In this example, machine 112 comprises a plastic injection ram 114, a first mold block 116 defining a first cavity system 118a, and a second mold block 120 defining a second cavity system 118b. Arrows 122 and 124 represent forcing first mold block 116 and second mold block 120 together such that first mold block 116 and second mold block 120 engage each other at a mold interface 126. FIG. 12 shows that upon forcing mold blocks 116 and 120 together, first cavity system 118a and second cavity system 118b create a total cavity 118. Arrows 128 and 130 represent injecting a plastic material 132 (e.g., molten or softened ABS) into total cavity 118. Arrows 134 represent solidifying the plastic material 132 in total cavity 118, thereby creating tape dispenser frame 12. FIG. 12 shows first sidewall 48 at least momentarily extending into both cavity systems 118a and 118b. FIG. 12 also shows second sidewall 52 at least momentarily extending into both cavity systems 118a and 118b. FIG. 12 also shows flanges 50 and 54 at least momentarily extending into both cavity systems 118a and 118b. While FIG. 3 shows frame 12 defining the spool's rotational axis 88, FIG. 12 shows mold interface 126 creating parting line 84 on first sidewall 48, wherein parting line 84 extends between bridge 46 and rotational axis 88, as shown in FIG. 1. FIG. 1 also shows parting line 84 being substantially perpendicular to rotational axis 88. In some examples, sidewall 52 includes an inner surface 52a facing sidewall 48 and an outer surface 48b facing away from sidewall 48, and parting line 84 is on the sidewall's outer surface 52b.

Arrow 136 of FIG. 13 represents removing tape dispenser frame 12 from total cavity 118. Arrows 138 of FIG. 9 represents resiliently splaying first sidewall 48 and second sidewall 52 to widen spool-receiving chamber 58 between first sidewall 48 and second sidewall 52. Arrow 140 of FIG. 9 represent inserting spool 16 into spool-receiving chamber 58. Arrows 142 of FIG. 10 represent first sidewall 48 and/or second sidewall 52 flexing toward spool 16. FIGS. 3, 5 and 10 show first flange 50 and second flange 54 supporting spool 16. FIGS. 3, 5 and 7 show first pawl 22 engaging the spool's inner diameter 30 such that spool 16 can rotate more freely in one direction 26 than in an opposite direction 24.

In some examples, pawl 22 is of a shape that facilitates a plastic injecting molding process. Referring back to FIGS. 4-7, pawl 22 includes base 96, a first edge 144 and a second edge 146. Base 96 adjoins first sidewall 48, and first edge 144 (with respect to axial direction 56) is between first sidewall 48 and second edge 146. First edge 144 extends lengthwise from base 96 to tip 28, and second edge 146 (with respect to axial direction 56) is between first edge 144 and second sidewall 52. Second edge 146 extends lengthwise from base 96 to tip 28, and first edge 144 and second edge 146 converge from base 96 to tip 28.

Figure 14:
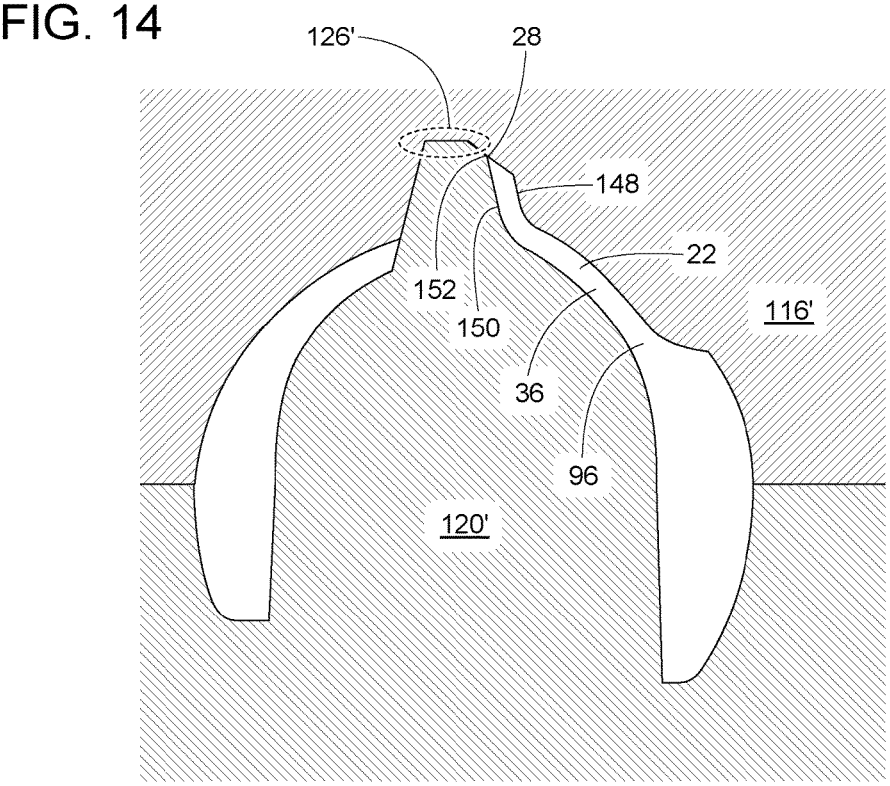
FIG. 14 is a cross-sectional view of two example mold blocks producing an example pawl in accordance with the teaching disclosed herein.

In some examples, as shown in FIG. 14, pawl 22 includes a first surface 148 and a second surface 150, wherein first surface 148 at least momentarily lies against a first mold block 116', and second surface 150 at least momentarily lies against a second mold block 120'. This results in a mold interface 126' creating a sharp parting line 152 at the pawl's tip 28 and thus at a point of contact 60 where pawl 22 engages the spool's inner diameter 30. In some examples, the spool's tip 28 being sharp enhances the pawl's ability to "bite" into the spool's inner surface 32 and thus more effectively resist reverse rotation of spool 16.

Figure 15:
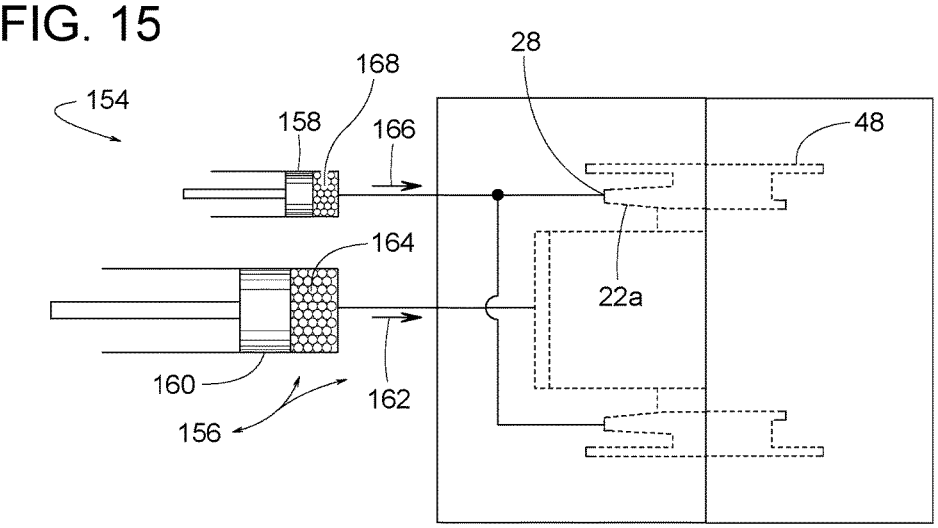
FIG. 15 is a schematic diagram similar to FIG. 12 but showing another example tape dispenser method in accordance with the teachings disclosed herein.
Figure 16:
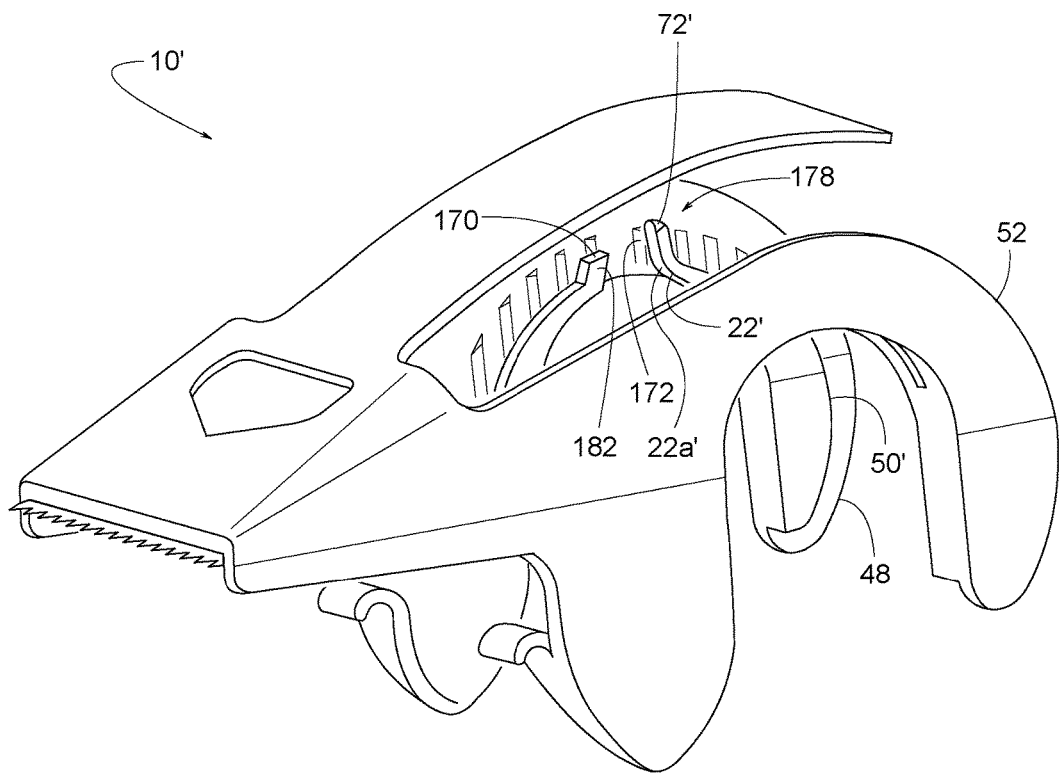
FIG. 16 is a perspective view similar to FIG. 1 but showing another example tape dispenser system constructed in accordance with the teachings disclosed herein.

FIG. 15 illustrates an example tape dispenser method 154 using a dual-injection process for making frame 12 with the pawl's tip 28 being softer and more flexible than sidewall 48. In some examples, tip 28 being relatively soft or rubbery increases the coefficient of friction between tip 28 and the spool's inner surface 32. The increased friction can improve the pawl's ability to resist reverse rotation of spool 16 while the pawl's greater flexibility enables pawl 22 to yield to the spool's forward rotation. The term, "dual injection" refers to any plastic injection molding process where the finished product is comprised of two different plastic injected materials. Examples of known dual injection processes include, but are not limited to, co-injection molding, multishot molding, overmolding, two-shot molding, two-times injection molding, and insert molding. In some examples, a single plastic injection molding machine 156 includes one ram 158 for injecting a thermoplastic elastomer or thermoset elastomer for the pawl's tip 28 and another ram 160 for injecting a thermoplastic or thermoset plastic for the rest of frame 12. Arrow 162 represents injecting a first base material 164 to create at least part of first sidewall 48, and arrow 166 represents injecting a second softer material 168 to create at least part of first pawl 22 (e.g., tip 28 of pawl 22).

It should be noted that all references cited in this disclosure, including U.S. Pat. Nos. 8,925,611; 8,813,806; 8,191,597; 8,042,592; 7,370,782; 7,353,854 are herein incorporated by reference in their entirety. Also, for further clarification, it should be further noted that the term, "pawl," refers to any finger, tab, bar or other elongate member that in reaction to being urged to move in a first direction across and relative to an adjacent surface, the elongate member tends to bind against the adjacent surface with more binding force in the first direction than in an opposite direction, wherein the adjacent surface can be of any geometry including, but not limited to, smooth, irregular, cogged, toothed, curved, etc. The term, "flange," refers to any protrusion extending at least partially from one sidewall toward another sidewall. The term, "bridge," as it pertains to first and second sidewalls, refers to any structural member that extends from the first sidewall to the second sidewall, thereby spanning the distance between the two sidewalls. The term, "monolithic," as it pertains to a structure means that the structure is a seamless unitary piece. A structure made using a common plastic injection molding process is one example of a monolithic structure. The term, "mold parting line," refers to a substantially linear step, offset or other discontinuity between two adjoining surfaces, wherein such a step, offset or discontinuity would be considered, by those of ordinary skill in the art, as actually being or at least resembling a surface imperfection that is typically characteristic of an imperfect or intentional interface between two plastic injection mold halves. In some examples, a mold parting line occurs along the interface between two adjoining surfaces of a part, wherein the two surfaces are slightly non-parallel (e.g., less than five degrees), which can be due (but not necessarily due) to a draft angle that facilitates removal of the part from a plastic injection mold. The term, "radial" refers to a direction generally perpendicular to the spool's rotational axis 88 when spool 16 is in the installed position. The term, "axial" refers to a direction generally parallel to the spool's rotational axis 88 when spool 16 is in the installed position. While spool 16 being in the installed position defines rotational axis 88, that defined rotational axis, by definition, remains fixed in space relative to bridge 46 even if spool 16 is later moved from the installed position to the removed position. The term, "converging," as it pertains to two edges means that the distance between the two edges becomes progressing less over the length of the edges; however, the edges do not necessarily intersect each other.

In addition or alternatively, some examples of tape dispenser system 10 are defined as a tape dispenser system comprising: first sidewall 48; second sidewall 52 spaced apart from first sidewall 48 to define a spool-receiving chamber 58 between first sidewall 48 and second sidewall 58; bridge 46 providing an integral seamless connection between first sidewall 48 and second sidewall 52; spool 16 disposed within spool-receiving chamber 58; adhesive tape 18 wrapped around spool 16; and first pawl 22a having a base 96, tip 28, first edge 144 and second edge 146, the base 96 adjoining first sidewall 48, tip 28 engaging spool 16, first edge 144 being between first sidewall 48 and second edge 146, first edge 144 extending lengthwise from base 96 to tip 28, second edge 146 being between first edge 144 and second sidewall 52, second edge 146 extending lengthwise from base 96 to tip 28, and first edge 144 and second edge 146 converging from base 96 to tip 28.

FIGS. 16-27 illustrate an example tape dispenser system 10' that is similar to tape dispenser system 10. Some examples of tape dispenser system 10' include: 1) a radially compressive interference fit between a monolithic frame 12' and the spool's inner diameter 30; 2) a radial backstop contact point 170 (fourth contact point 170); and/or 3) a lateral backstop surface 172. Backstops 170 and 172 provide pawl 22 and/or a finger 22' with radial and lateral travel limits that prevent pawl 22 and/or finger 22' from being forcibly bent in either direction beyond its yield point.

The radial compressive fit, as illustrated by a first circle 174 and a smaller second circle 176 shown in FIG. 19, creates a biting action (e.g., pawl with a sharp edge) and/or gripping friction between the spool's inner diameter 30 and a distal end 178 of a resilient finger 22' (e.g., first fingers 22a' and 22b'). The biting action and/or gripping friction helps prevent spool 16 from accidentally rotating backwards. In some examples, the finger's distal end 178 exerts a frictional gripping force that is greater in one rotational direction of spool 16 than in an opposite direction of rotation. In some examples, the magnitude of the frictional gripping force is substantially the same in either direction.

In addition or alternatively, radial backstop contact point 170 (fourth contact point 170) provides a firm radial backstop 182 that helps prevent a user or a manufacturer from unintentionally breaking finger 22' as a result of manually or mechanically pushing tape spool 16 too far in a downward radial direction 180, wherein arrow 180 of FIG. 20 represents downward radial direction 180. In other words, radial backstop 182 engages the spool's inner diameter 30 before spool 16 can bend 22' past its yield point.

Figure 26:
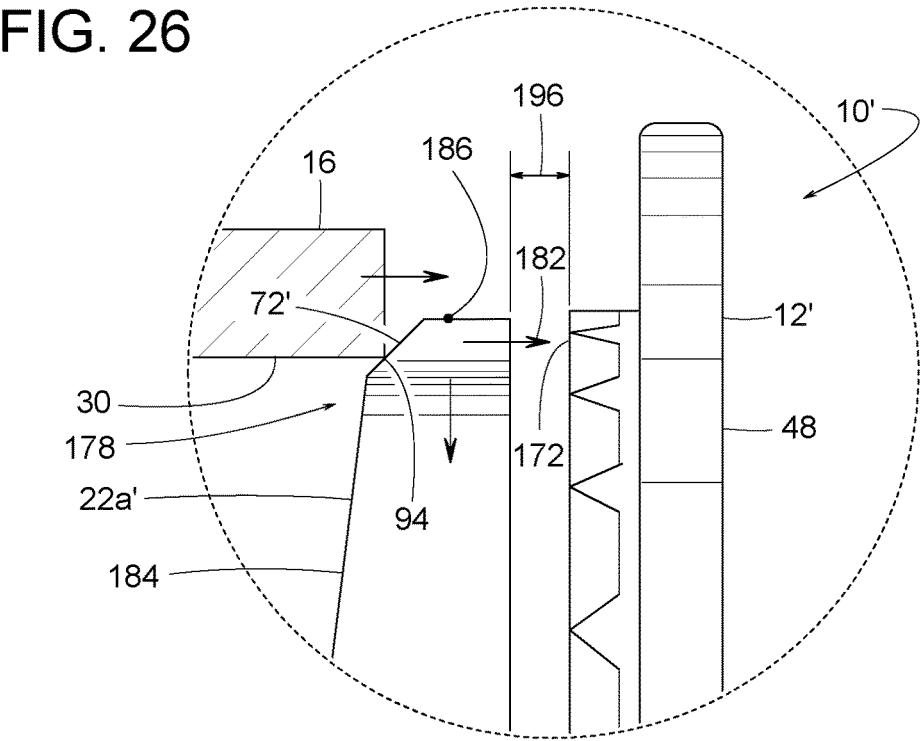
FIG. 26 is an enlarged view similar to FIG. 6 but showing the example tape dispenser system of FIG. 16.

In addition or alternatively, lateral backstop surface 172 provides a firm lateral backstop that helps prevents a user or a manufacturer from unintentionally breaking finger 22 as a result of manually or mechanically pushing tape spool 16 too far in lateral direction 182, wherein arrow 182 of FIG. 26 represents lateral direction 182. In other words, the finger's distal end 178 engages lateral backstop surface 172 before spool 16 can bend finger 22' past its yield point.

In the example illustrated in FIGS. 16-27, tape dispenser system 10' comprises a plastic injected molded monolithic frame 12' that includes first sidewall 48, second sidewall 52, a first flange 50', a second flange 54', and bridge 46. In the illustrated example, resiliently flexible finger 22a' extends integrally from first sidewall 48 and/or from first flange 50'. In some examples, a similar second resiliently flexible finger 22b' extends integrally from second sidewall 52 and/or from second flange 54'. In the illustrated example, finger 22 comprises a spring arm 184, distal end 178, and a first contact point 186 on distal end 178. Spring arm 184 extends from first sidewall 48 and/or from first flange 50', and spring arm 184 supports distal end 178 in a cantilevered manner. The radial interference fit between frame 12' and spool 16, and radial backstop 182 protecting finger 22' from bending too far and breaking are illustrated with reference to FIGS. 17-20.

Figure 17:
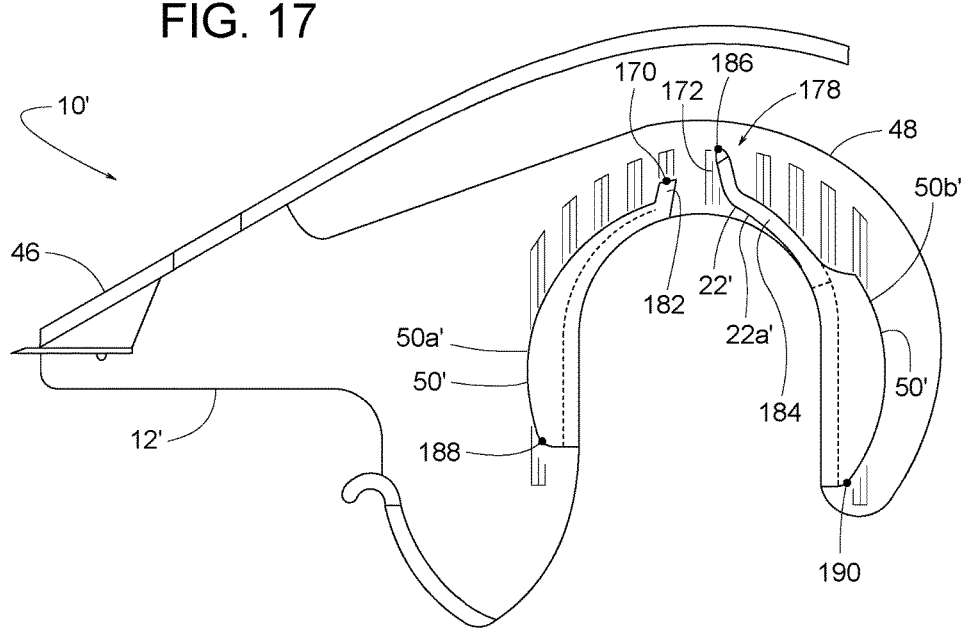
FIG. 17 is a cross-sectional view similar to FIG. 2 but showing the tape dispenser system of FIG. 16.
Figure 18:
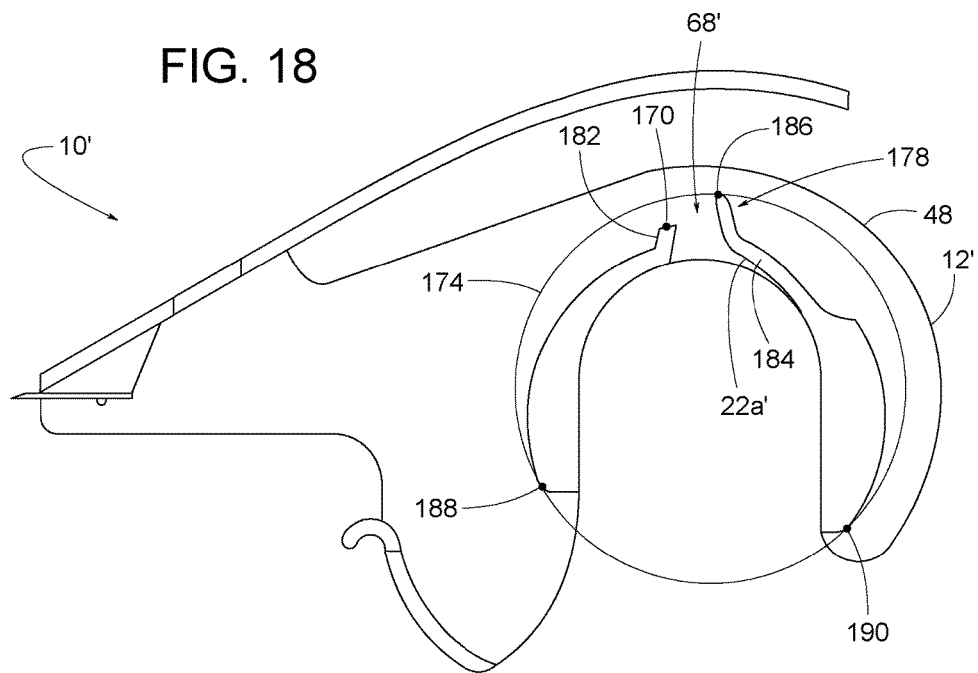
FIG. 18 is a diagram of FIG. 17 showing geometric features associated with the spool being in the removed position.
Figure 21:
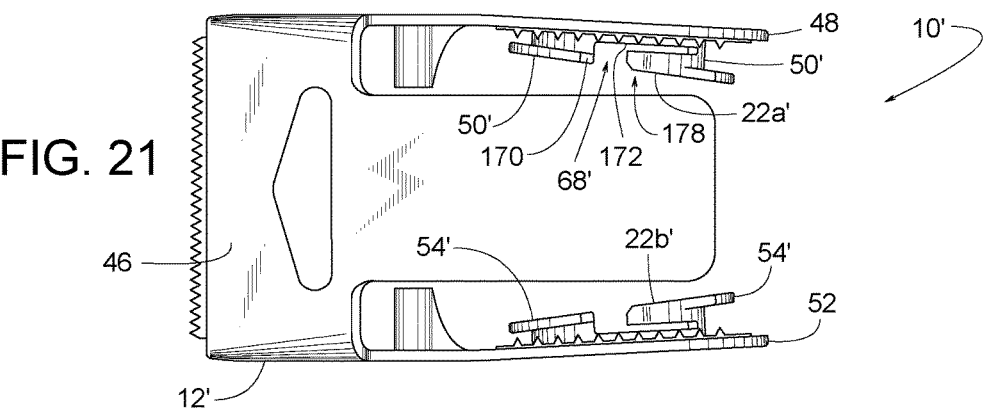
FIG. 21 is a top view similar to FIG. 8 but showing the tape dispenser system of FIG. 16.
Figure 22:
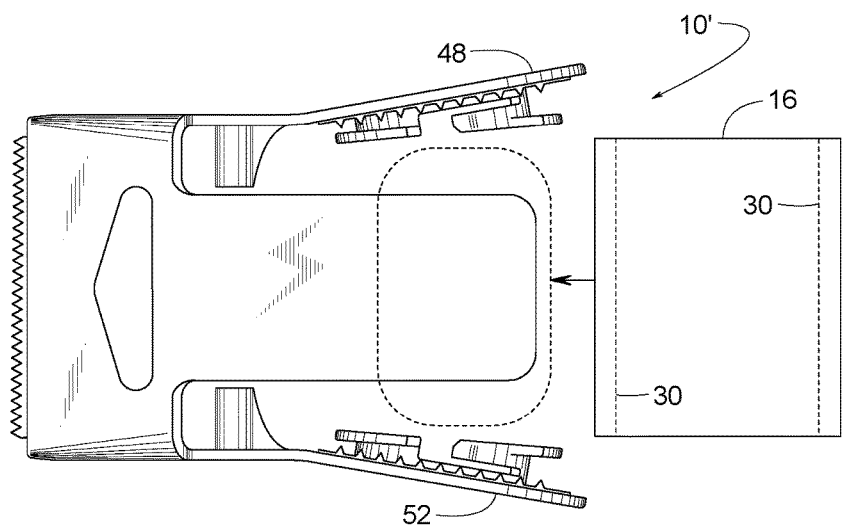
FIG. 22 is a top view similar to FIG. 9 but showing the tape dispenser system of FIG. 16.
Figure 23:
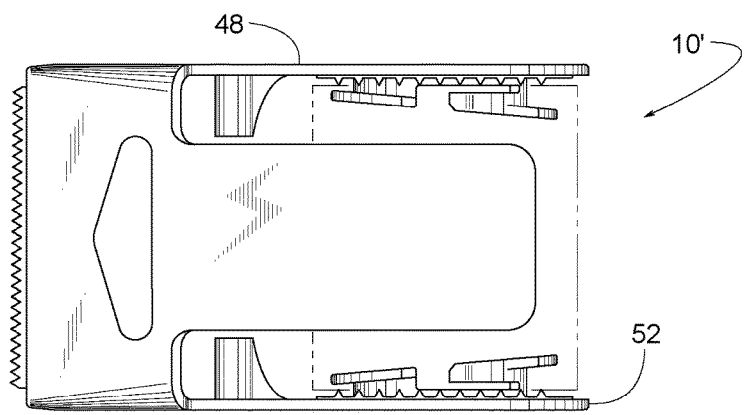
FIG. 23 is a top view similar to FIG. 10 but showing the tape dispenser system of FIG. 16.

FIG. 17 shows tape dispenser frame 12' having first contact point 186 on distal end 178 of finger 22', a second contact point 188 on flange 50' (e.g., on flange segment 50a'), a third contact point 190 on flange 50' (e.g., on flange segment 50b'), and fourth contact point 170 on radial backstop 182. Referring further to FIG. 18, first contact point 186, second contact point 188 and third contact point 190 define first circle 174. Three points defining a circle means that all three points lie on the circle when viewed from the side perspective, e.g., as shown in FIGS. 17-20. First circle 174 and the location of points 186, 188 and 190 are as they would appear when frame 12' is in its relaxed position with spool 16 in its removed position. First circle 174 is larger than the spool's inner diameter 30, thereby creating a radial interference fit between frame 12' and the spool's inner diameter 30 when frame 12' is in its loaded position with spool 16 being in its installed position (e.g., as shown in FIGS. 3, 5, 7, 10, 23 and 27).

FIG. 19 shows first contact point 186 of distal end 178 having been resiliently moved relative to second contact point 188 and third contact point 190 to define second circle 176, which is smaller and radially offset with reference to first circle 174. The resilient movement of first contact point 186 is by virtue of the finger's spring arm 184 being resiliently flexible. FIG. 19 represents a configuration where frame 12' is in its loaded position with spool 16 being in the installed position. When spool 16 is in the installed position, second circle 176 coincides with the spool's inner diameter 30, which is slightly smaller than first circle 174. Thus, the radial interference fit between frame 12' and spool 16 is what moves first contact point 186 from first circle 174 to second circle 176. During use, as spool 16 rotates within frame 12' upon paying out tape 14, the spool's inner diameter 30 slides along and is generally guided by contact points 186, 188 and 190. Frictional drag between the spool's inner diameter 30 and contact point 186, 188 and/or 190 is what helps prevent spool 16 from accidentally rotating backwards.

FIG. 20 shows second contact point 188, third contact point 190 and fourth contact point 176 defining a third circle 192, which is smaller than second circle 176. However, third circle 192 is not so small that finger 22' would break or exceed its yield point (yield strength) if the finger's distal end 178 were forced to lie on third circle 192. Thus, fourth contact point 170 on radial backstop 182 is strategically positioned as shown so as to protect finger 22' from damage. Since third circle 192 is smaller than second circle 176 and thus smaller than the spool's inner diameter 30, the spool's inner diameter 30 may be spaced apart from second contact point 188 and/or third contact point 190 when spool 16 is forced to its radially displaced position, as shown in FIG. 20 (see inner diameter 30 being spaced apart from points 188 and 190).

FIGS. 21-27 illustrate lateral backstop surface 172 being able to protect finger 22a' from exceeding its yield point or breakage as a result of the spool's inner axial edge 94 pushing the finger's distal end 178 laterally outward during the process of installing tape spool 16 into frame 12'. Frame 12' of FIGS. 21, 22 and 23 correspond to frame 12 of FIGS. 8, 9 and 10, respectively. Thus, the concept of using lateral backstop surface 172 for protecting finger 22' or pawl 22 applies to both tape dispenser systems 10 and 10'.

Figure 24:
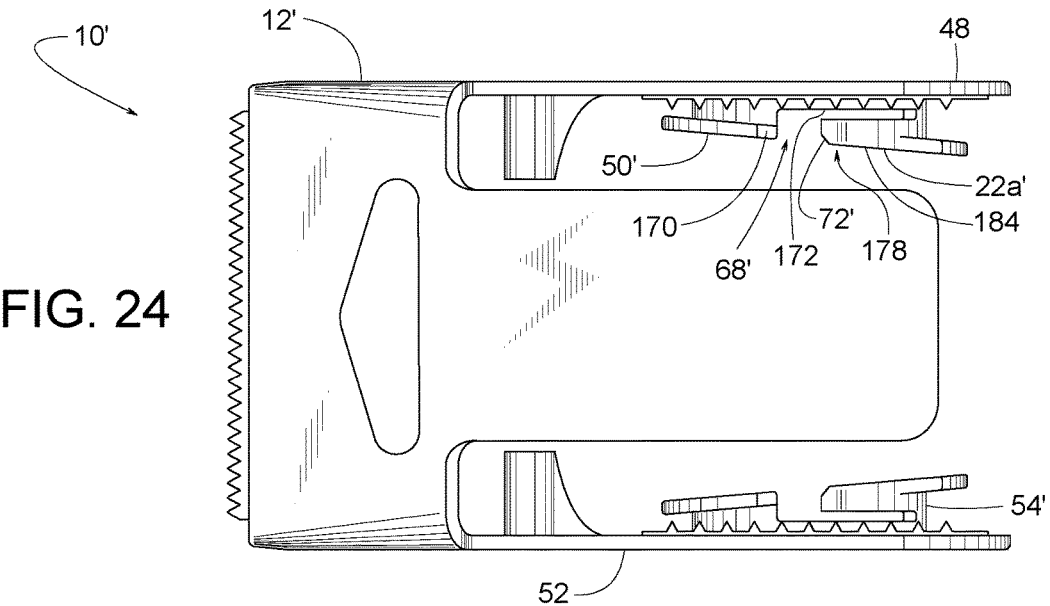
FIG. 24 is an enlarged top view of the tape dispenser system of FIG. 16.
Figure 25:
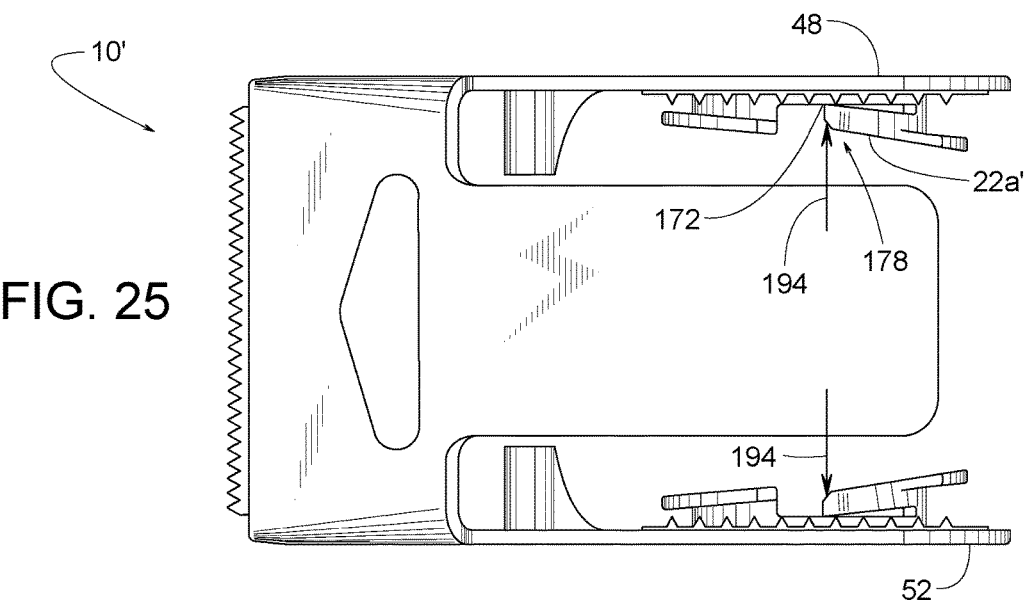
FIG. 25 is an enlarged top view similar to FIG. 25 but showing the finger being resiliently bent laterally outward with the finger's distal end up against a lateral backstop surface.
Figure 27:
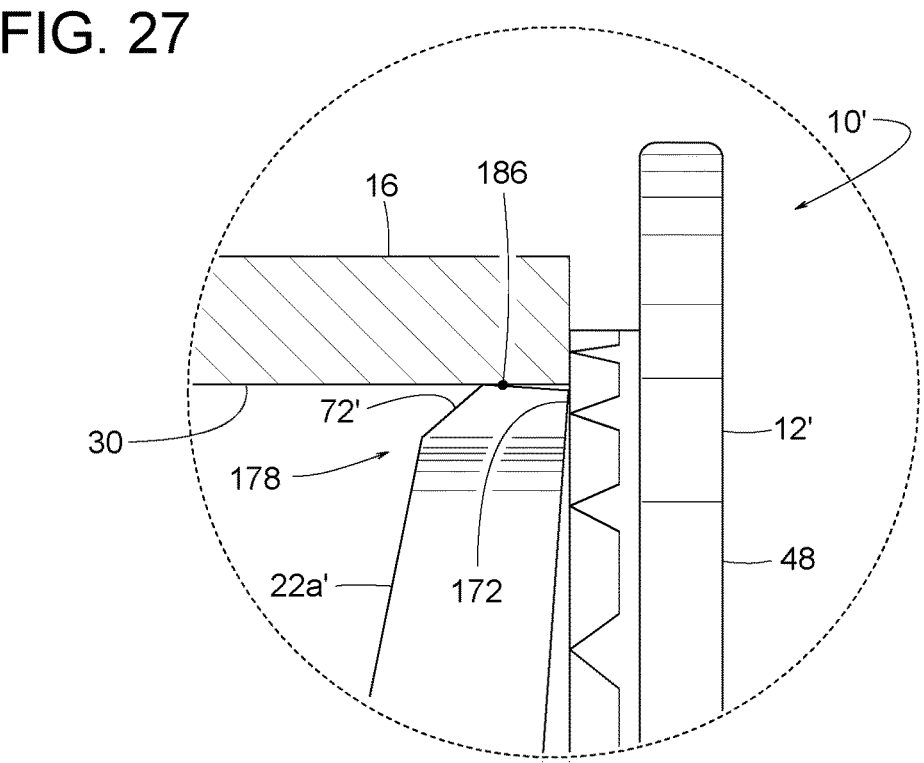
FIG. 27 is an enlarged view similar to FIG. 7 but showing the example tape dispenser system of FIG. 16 and further showing the finger being resiliently bent laterally outward with the finger's distal end up against the lateral backstop surface.

FIG. 24 shows frame 12' in the relaxed position with the finger's distal end 178 being spaced apart from lateral backstop surface 172. FIG. 25 shows a lateral force 194 exerted by spool 16 (or some other body) pushing the finger's distal end 178 up against lateral backstop surface 172. FIG. 27 shows another view of distal end 178 engaging lateral backstop surface 172. A minimal gap 196 between relaxed finger 22a' and lateral backstop surface 172 prevents distal end 178 from being able to move so far laterally as to cause finger 22a' to exceed its yield point upon distal end 178 engaging lateral backstop surface 172. As distal end 178 is forced from the position shown in FIG. 26 to that of FIG. 27, the spool's inner axial edge 94 engaging and sliding along a lead-in surface 72' on distal end 178 forces first contact point 186 to second circle 176 where first contact point 186 engages the spool's inner diameter 30.

Figure 28:
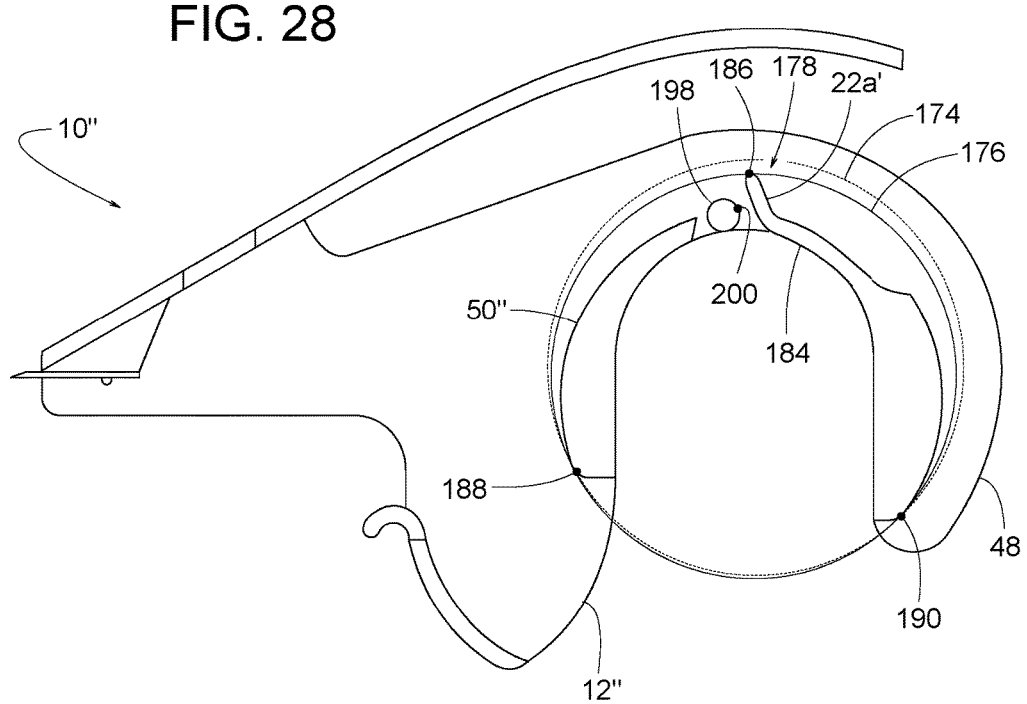
FIG. 28 is a diagram similar to FIG. 19 but showing another example tape dispenser system constructed in accordance with the teachings disclosed herein.
Figure 29:
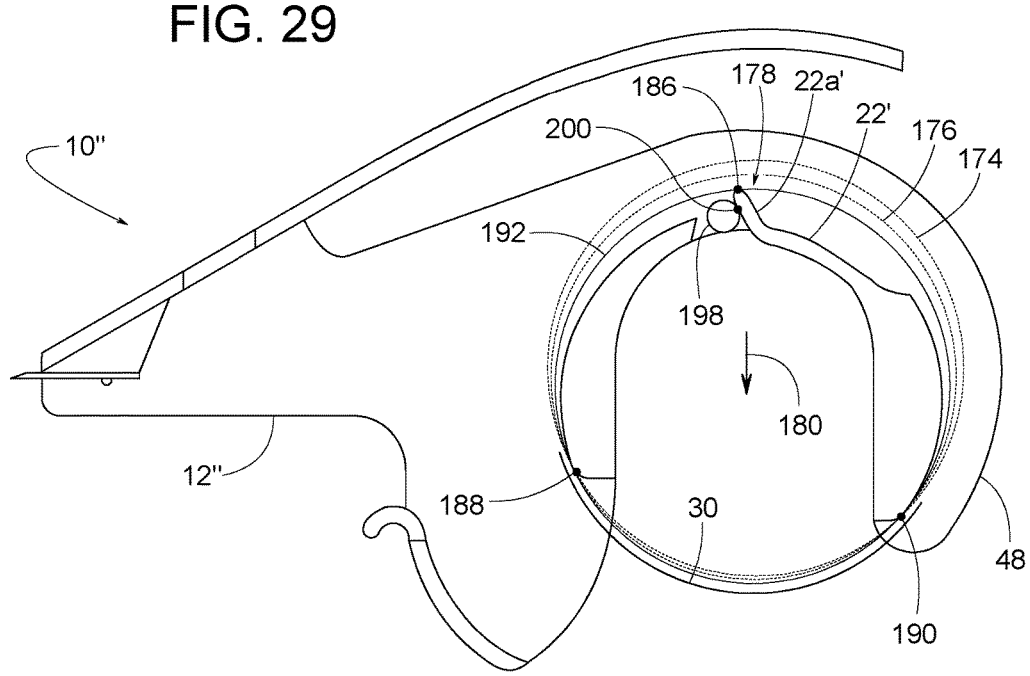
FIG. 29 is a diagram showing the tape dispenser of FIG. 28 but with the spool shown in its displaced position.
Figure 30:
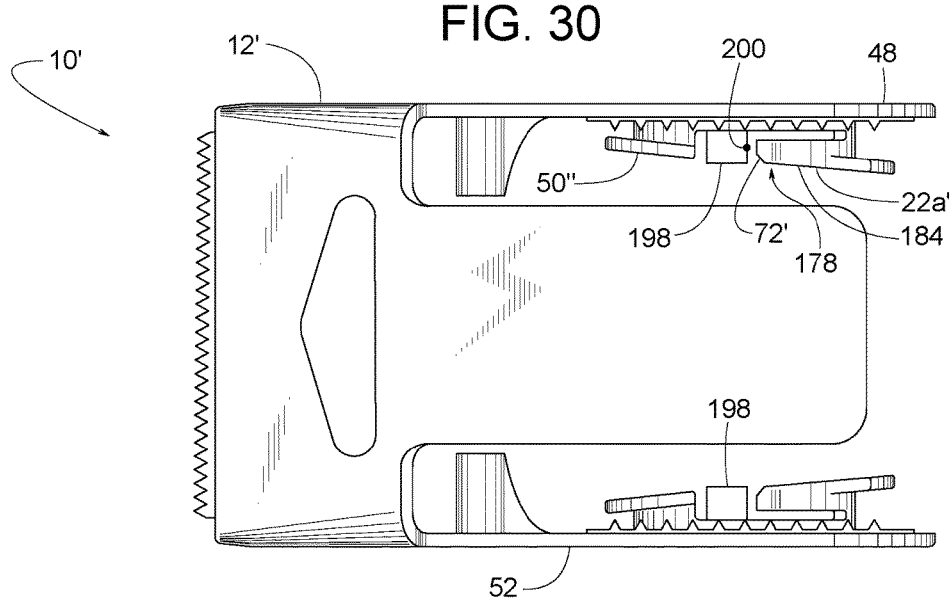
FIG. 30 is a diagram similar to FIG. 28 but showing geometric features associated with the spool being in the radially displaced position.

FIGS. 28-30 show an example tape dispenser system 10". In this example, a radial backstop 198 extending from sidewall 48 or from first flange 50" limits how far finger 22a' can bend, thereby preventing finger 22a' from being bent so far as to exceed its yield point. A fourth contact point 200 on radial backstop 198 is spaced apart from finger 22a' when first contact point 186 is on first circle 174 or on second circle 176. If spool 16, however, is forced to its displaced position, as shown in FIG. 29, finger 22a' engages fourth contact point 200 on radial backstop 198, and first contact point 186 stops at third circle 192. In this example, first contact point 186, second contact point 188 and third contact point 190 define third circle 192, and fourth contact point 200 does not necessarily lie on third circle 192.

Figure 31:
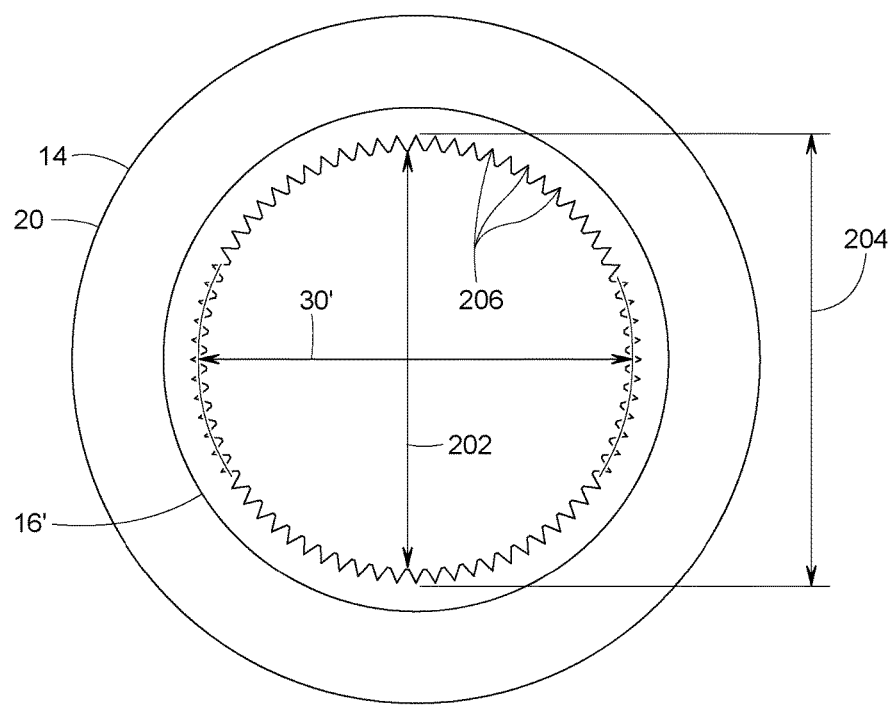
FIG. 31 is an axial end view of an example spool constructed in accordance with the teachings disclosed herein.

In addition or alternatively, some examples of tape dispenser systems 10, 10' and 10" include a spool 16', which in some examples is a cardboard or plastic tube with a fluted inner diameter 30', as shown in FIG. 31. A plurality of grooves 206 provides a more positive engagement with the pawl's tip 28 or the finger's distal end 178. In the illustrated example, the spool's inner diameter 30' equals the simple mathematical average of the spool's maximum inside diameter 204 and the spool's minimum inside diameter 202.

The terms, first circle, second circle and third circle are spatial geometric terms and thus are not necessarily physical structures. A first contact point being resiliently movable from a first circle to a second circle means that the frame does not exceed its yield point as the first contact point moves from the first circle to the second circle, thus after the first contact point reaches the second circle, the frame has sufficient resilience for the first contact point to return to the first circle without irreversible distortion of the frame. A finger being resiliently moveable selectively to an inner position and an outer position means that such movement can occur without the finger exceeding its yield point, thus after the distal end engages the lateral backstop surface, the finger has sufficient resilience to return from its outer position (e.g., FIG. 27) to its inner position (FIG. 26) without irreversible distortion of the finger. The term, "inner diameter" as it relates to the inner diameter of a spool refers to the inner peripheral surface of the spool. The term, "loaded position" refers to the spool being in a predetermined normal installed location within the spool-receiving chamber of the dispenser. The term, "radially displaced position," refers to the spool still being within the dispenser's spool-receiving chamber but offset relative to the spool's normal loaded position (see inner diameter 30 in FIG. 20), wherein the offset is in a direction perpendicular to the spool's axial longitudinal centerline. The terms, "first contact point," "second contact point," "third contact point," and "fourth contact point," refer to points on the dispenser frame that may engage the spool depending on the positions of the spool and the frame. With certain combinations of spool and frame positions, some contact points are spaced apart from the spool (e.g., point 188 or 190 of FIG. 20). Tip 28 of pawl 22a is one example of first contact point 186, and just as spring arm 36 provides tip 28 with resilient movement, similarly designed spring arm 36' provides first contact point 186 on distal end 178 with resilient movement. Similar to dispenser 10; which includes first pawl 22a, second pawl 22b, first sidewall 48, second sidewall 52, first flange 50, second flange 54, air gap 68 and lead-in surface 72; tape dispenser system 10' respectively includes a first finger 22a', a second finger 22b', first sidewall 48, second sidewall 52, a first flange 50', a second flange 54', air gap 68' and lead-in surface 72'. In the illustrated example, air gap 68' is between flange segments 50a' and 50b'. In some examples, sidewall 48 substantially a mirror image of sidewall 52. In some examples, flange 50 is substantially a mirror image of flange 54. In some examples, flange 50' is substantially a mirror image of flange 54'. In some examples, frame 12' (similar to frame 12) is plastic injection molded of a polystyrene based plastic, such as, for example, ABS (acrylonitrile butadiene styrene).

Some examples of tape dispenser systems 10 and 10' are defined as follows:

Definition-1 is a tape dispenser system (10/10') comprising:

a first sidewall (48);

a second sidewall (52) spaced apart from the first sidewall to define a spool-receiving chamber (58) between the first sidewall and the second sidewall;

a bridge (46) extending from the first sidewall to the second sidewall, the bridge having a tape-discharge edge (74);

a first flange (50/50') extending from the first sidewall toward the second sidewall;

a second flange (54/54') extending from the second sidewall toward the first sidewall;

a spool (16) having selectively an installed position (FIGS. 10 and 23) and a removed position (FIGS. 9 and 22), the spool being radially supported by the first flange and the second flange within the spool-receiving chamber when the spool is in the installed position, the spool being outside of the spool-receiving chamber when the spool is in the removed position, the spool having an axial length (38) and an inner diameter (30);

an adhesive tape (14) wrapped around the spool;

a lateral backstop surface (172) on at least one of the first flange and the first sidewall;

a finger (22/22a/22b/22'/22a'/22b') extending from at least one of the first flange and the first sidewall, the finger extending in a cantilevered manner to a distal end (28) of the finger, the finger being resiliently movable selectively to an inner position (FIGS. 24 and 26) and an outer position (FIGS. 25 and 27) relative to the first sidewall, the distal end being spaced apart from the lateral backstop surface when the finger is at the inner position, the distal end engaging the lateral backstop surface when the finger is in the outer position, the spool urging the distal end from the inner position to the outer position as the spool moves from the removed position to the installed position, the distal end of the finger engaging the inner diameter of the spool when the spool is in the installed position; and a monolithic frame (12/12') being comprised of the first sidewall, the second sidewall and the bridge; the monolithic frame being configured selectively to a relaxed position (FIGS. 8 and 21), a splayed position (FIGS. 9 and 22), and a loaded position (FIGS. 10 and 23); the first sidewall being at a first distance (102) from the second sidewall when the monolithic frame is in the relaxed position; the first sidewall being at a second distance (104) from the second sidewall when the monolithic frame is in the splayed position; the second distance being greater than the first distance; the second distance providing sufficient clearance for the spool to be moved between the installed position and the removed position; the monolithic frame being in the relaxed position when the spool is in the removed position; and the monolithic frame being in the loaded position when the spool is in the installed position.

Definition-2 is the tape dispenser system as recited in Definition-1, plus wherein the monolithic frame is comprised of the first sidewall, the second sidewall, the bridge, and the finger.

Various modifications and alterations to this invention will become apparent to those of ordinary skill in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

The invention claimed is:

1. A tape dispenser system comprising:
   a first sidewall;
   a second sidewall spaced apart from the first sidewall to define a spool-receiving chamber between the first sidewall and the second sidewall;
   a bridge extending from the first sidewall to the second sidewall, the bridge having a tape-discharge edge;
   a first flange extending from the first sidewall toward the second sidewall;
   a second flange extending from the second sidewall toward the first sidewall;
   a spool having selectively an installed position and a removed position, the spool being radially supported by the first flange and the second flange within the spool-receiving chamber when the spool is in the installed position, the spool being outside of the spool-receiving chamber when the spool is in the removed position, the spool having an axial length and an inner diameter;
   an adhesive tape wrapped around the spool;
   a first contact point;
   a second contact point being on at least one of the first flange and the first sidewall;
   a third contact point being on at least one of the first flange and the first sidewall, the first contact point being resiliently movable relative to both the second contact point and the third contact point;
   the first contact point, the second contact point and the third contact point defining a first circle when the spool is in the removed position; the first circle being larger in diameter than the inner diameter of the spool, the first contact point, the second contact point and the third contact point engaging the inner diameter of the spool when the spool is in the installed position; the first contact point, the second contact point and the third contact point defining a second circle when the spool is in the installed position, the first circle being larger than the second circle, the first circle being radially offset relative to the second circle, the first contact point relative to both the second contact point and the third contact point being resiliently movable from the first circle to the second circle;
   a monolithic frame being comprised of the first sidewall, the second sidewall and the bridge; the monolithic frame being configured selectively to a relaxed position, a splayed position, and a loaded position; the first contact point being at a first distance from the second sidewall when the monolithic frame is in the relaxed position; the first contact point being at a second distance from the second sidewall when the monolithic frame is in the splayed position; the first contact point being at a third distance from the second sidewall when the monolithic frame is in the loaded position; the second distance being greater than the first distance; the third distance being greater than the first distance; the second distance being greater than the third distance; the second distance providing sufficient clearance for the spool to be moved between the installed position and the removed position; the monolithic frame being in the relaxed position when the spool is in the removed position; and the monolithic frame being in the loaded position when the spool is in the installed position;
   a finger extending in a cantilevered manner from at least one of the first sidewall and the first flange to terminate at a distal end of the finger, the first contact point being on the distal end of the finger, the finger being resiliently flexible;
   a radial backstop extending from at least one of the first sidewall and the first flange;
   a fourth contact point on the radial backstop, the fourth contact point being spaced apart from both the spool and the finger when the spool is in the installed position; and
   the spool being further movable from the installed position to a radially displaced position by virtue of the first contact point being resiliently movable relative to the second contact point and the third contact point, the finger engaging the fourth contact point when the spool is in the radially displaced position.

2. The tape dispenser of claim 1, wherein at least one of the second contact point and the third contact point is spaced apart from the spool when the spool is in the radially displaced position.

3. A tape dispenser system comprising:
   a first sidewall;
   a second sidewall spaced apart from the first sidewall to define a spool-receiving chamber between the first sidewall and the second sidewall;
   a bridge extending from the first sidewall to the second sidewall, the bridge having a tape-discharge edge;
   a first flange extending from the first sidewall toward the second sidewall;
   a second flange extending from the second sidewall toward the first sidewall;
   a spool having selectively an installed position and a removed position, the spool being radially supported by the first flange and the second flange within the spool-receiving chamber when the spool is in the installed position, the spool being outside of the spool-receiving chamber when the spool is in the removed position, the spool having an axial length and an inner diameter, the spool being rotatable about a rotational axis relative to the first flange and the second flange;

an adhesive tape wrapped around the spool;

a lateral backstop surface on at least one of the first flange and the first sidewall;

a finger extending from at least one of the first flange and the first sidewall, the finger extending in a cantilevered manner to a distal end of the finger, the finger being resiliently movable selectively toward the first sidewall to an inner position and away from the first sidewall to an outer position, the distal end being spaced apart from the lateral backstop surface when the finger is at the inner position, the distal end engaging the lateral backstop surface when the finger is at the outer position, the distal end of the finger engaging the inner diameter of the spool when the spool is in the installed position; and a monolithic frame being comprised of the first sidewall, the second sidewall and the bridge; the monolithic frame being configured selectively to a relaxed position, a splayed position, and a loaded position; the first sidewall being at a first distance from the second sidewall when the monolithic frame is in the relaxed position; the first sidewall being at a second distance from the second sidewall when the monolithic frame is in the splayed position; the first sidewall being at a third distance from the second sidewall when the monolithic frame is in the loaded position; the second distance being greater than the first distance; the second distance providing sufficient clearance for the spool to be moved between the installed position and the removed position; the monolithic frame being in the relaxed position when the spool is in the removed position; and the monolithic frame being in the loaded position when the spool is in the installed position.

4. The tape dispenser of claim 3, wherein the monolithic frame is comprised of the first sidewall, the second sidewall, the bridge, and the finger.

5. The tape dispenser of claim 3, wherein the third distance is substantially equal to the first distance.

6. The tape dispenser of claim 3, wherein the third distance is greater than the first distance.

* * * * *